US010164924B2

(12) United States Patent
Arastafar et al.

(10) Patent No.: US 10,164,924 B2
(45) Date of Patent: Dec. 25, 2018

(54) SYSTEMS, DEVICES AND METHODS FOR INITIATING COMMUNICATIONS BASED ON SELECTED CONTENT

(71) Applicant: RingCentral, Inc., Belmont, CA (US)

(72) Inventors: Martin Arastafar, Redwood City, CA (US); Christopher van Rensburg, Foster City, CA (US); Theodore Jaffe, Hillsborough, CA (US)

(73) Assignee: RingCentral, Inc., Belmont, CA (US)

( * ) Notice: Subject to any disclaimer, the term of this patent is extended or adjusted under 35 U.S.C. 154(b) by 0 days.

(21) Appl. No.: 14/869,368

(22) Filed: Sep. 29, 2015

(65) Prior Publication Data

US 2017/0093774 A1 Mar. 30, 2017

(51) Int. Cl.
*G06F 15/16* (2006.01)
*H04L 12/58* (2006.01)
*H04L 29/06* (2006.01)

(52) U.S. Cl.
CPC .............. *H04L 51/14* (2013.01); *H04L 51/16* (2013.01); *H04L 51/08* (2013.01); *H04L 65/00* (2013.01)

(58) Field of Classification Search
CPC ......... H04L 51/08; H04L 51/14; H04L 51/16; H04L 65/1069; H04L 65/1076; H04L 67/141; H04L 65/00
See application file for complete search history.

(56) References Cited

U.S. PATENT DOCUMENTS

| 5,760,773 | A * | 6/1998 | Berman | G06F 1/1626 345/672 |
| 6,393,461 | B1 * | 5/2002 | Okada | G06Q 10/10 709/203 |
| 8,380,875 | B1 * | 2/2013 | Gilmour | G06Q 99/00 370/352 |
| 8,831,191 | B1 * | 9/2014 | Vendrow | H04M 3/42042 379/142.01 |
| 2005/0289471 | A1 * | 12/2005 | Thompson | G06F 3/0481 715/751 |
| 2007/0047695 | A1 * | 3/2007 | Tal | H04M 3/42195 379/67.1 |

(Continued)

OTHER PUBLICATIONS

Fairbrother, Helen A. et al., "AT&T Chat 'N Talk: Getting to Know You without Getting to Know All About You," AT&T Labs, Jun. 3, 1999 (12 pages).

*Primary Examiner* — Lance Leonard Barry
(74) *Attorney, Agent, or Firm* — Finnegan, Henderson, Farabow, Garrett & Dunner, LLP

(57) ABSTRACT

A communications device comprising at least one processing device configured to receive an input selection for use in connection with a communications session, including content of a portion of a chat associated with at least one first user and contact information associated with a second user, wherein the second user is different from the at least one first user. The at least one processing device is further configured to identify at least one object in the selected content to determine information describing the chat portion, and to initiate a communications session with at least one terminal device associated with the second user based on the contact information. The at least one processing device is also configured to transmit a message, including the determined information, to the at least one terminal device associated with the second user.

23 Claims, 19 Drawing Sheets

(56) References Cited

U.S. PATENT DOCUMENTS

| | | | |
|---|---|---|---|
| 2008/0208984 A1* | 8/2008 | Rosenberg | G06Q 10/107 709/206 |
| 2009/0110162 A1* | 4/2009 | Chatterjee | H04M 3/42068 379/93.23 |
| 2009/0213852 A1* | 8/2009 | Krishnamurthi | H04L 51/14 370/389 |
| 2010/0146066 A1* | 6/2010 | Bian | H04L 51/066 709/206 |
| 2010/0167710 A1* | 7/2010 | Alhainen | H04M 1/72583 455/416 |
| 2012/0030289 A1 | 2/2012 | Buford et al. | |
| 2013/0138746 A1* | 5/2013 | Tardelli | H04L 12/6418 709/206 |
| 2013/0144603 A1* | 6/2013 | Lord | H04L 12/1831 704/9 |
| 2014/0218461 A1* | 8/2014 | DeLand | H04L 12/1813 348/14.07 |
| 2014/0280646 A1* | 9/2014 | Lederer | H04L 51/22 709/206 |
| 2015/0172462 A1* | 6/2015 | Cudak | H04M 3/4365 455/413 |
| 2015/0200893 A1* | 7/2015 | Harris | G06Q 10/101 709/206 |
| 2015/0229761 A1* | 8/2015 | Lee | G06F 17/30746 455/414.1 |
| 2015/0256491 A1* | 9/2015 | Eatough | H04L 51/046 709/206 |
| 2016/0065731 A1* | 3/2016 | Kurstak | H04M 1/72519 455/414.1 |
| 2016/0242176 A1* | 8/2016 | Sun | H04W 72/0446 |

\* cited by examiner

1400       Collab Central - john_r

- Contacts
- Conversations
- paul, madhatter, raj_p, it_joe 2015-05-06 11:29am
- cindy_merring 2015-05-02 5:43pm
- samantha_ux 2015-04-25 1:01pm

- cindy_merring facilities manager
- it_joe manager, netops and IT
- madhatter netops wizard
- m_carruthers junior ops technician
- paul VP of product management    AD-sync.docx
- raj_p director, engineering

File Manager - /john/Documents/product

- ▶ accepted
- ▶ Active Directory
  - ▼ AD Editor
  - ▼ AD Integration
- ▶ backlog
  - ▼ 2016
    - ▶ 2016-H1
    - ▶ 2016-H2
- ▶ development
- ▶ pending review
- ▶ Roadmap
- ▶ showcase

| | |
|---|---|
| txt | AD-overview.txt |
| pptx | AD-presentation.pptx |
| docx | AD-sync.docx |
| txt | misc notes.txt |

Fig. 14

SYSTEMS, DEVICES AND METHODS FOR INITIATING COMMUNICATIONS BASED ON SELECTED CONTENT

TECHNICAL FIELD

The present disclosure relates to electronic communications systems and, more particularly, to methods and devices for managing aspects of communications sessions.

BACKGROUND

Electronic communications services have become increasingly important in today's society. Electronic communications service providers offer various means for establishing communications sessions between two or more users. For example, users may communicate using email services, chat services, telephone services, voice or video over IP services, fax services, and more. When users initiate communications sessions, they often have specific purposes in mind. For example, a user may place a telephone call with a particular recipient to discuss a specific email or a matter raised during an earlier conversation with a third party. At the time the call is established, however, the recipient may be unaware of the user's purpose of the call, and usually a period of time is elapsed at the beginning of the call in order to provide the recipient with the background and the purpose of the call.

A Caller ID is a known electronic communications service that provides recipients information about the identity of a caller associated with the device that initiated the communications session. Even though in some cases the recipient may guess the purpose of the call based on the Caller ID information (e.g., when the recipient and the user have a single pending matter), the Caller ID service provides only a partial solution. Therefore, there is a need for dynamic system that provides recipients with information regarding incoming communications sessions.

SUMMARY

In one aspect, the present disclosure is directed to a communications device for providing recipients with information regarding communications sessions. The communications device may include structures configured to (i) receive from a user an input selection for use in connection with a communications session, (ii) determine information regarding previously exchanged communication, based on selected content, (iii) initiate a communications session with at least one terminal device associated with a particular recipient, based on contact information associated with the input selection, and (iv) transmit data to the at least one terminal device associated with the particular recipient.

In another aspect, the present disclosure is directed to a method for providing recipients with information regarding communications sessions. The method may include receiving from a user an input selection for use in connection with a communications session. The method may also include using selected content to determine information, and using contact information associated with the input selection to initiate the communications session with at least one terminal device associated with a particular recipient. The method may further include transmitting data to the at least one terminal device associated with the particular recipient.

In yet another aspect, the present disclosure is directed to a computer program embodied in a computer readable medium and executable by a processor. The computer program may include instructions enabling the processor to provide recipients with information regarding communications sessions, receive from a user an input selection for use in connection with a communications session, use selected content to determine information, and use contact information associated with the input selection to initiate the communications session with at least one terminal device associated with a particular recipient. The processor may also transmit data to the at least one terminal device associated with the particular recipient.

BRIEF DESCRIPTION OF THE DRAWINGS

The accompanying drawings, which are incorporated in and constitute part of this disclosure, together with the description, illustrate and serve to explain the principles of various example embodiments.

FIGS. 7-19 are additional screen shots illustrating GUI features for initiating a communications sessions according with embodiments of the present disclosure.

DETAILED DESCRIPTION

Reference will now be made in detail to example embodiments implemented according to the present disclosure, the examples of which are illustrated in the accompanying drawings. Wherever possible, the same reference numbers will be used throughout the drawings to refer to the same or like parts.

Figure 1:
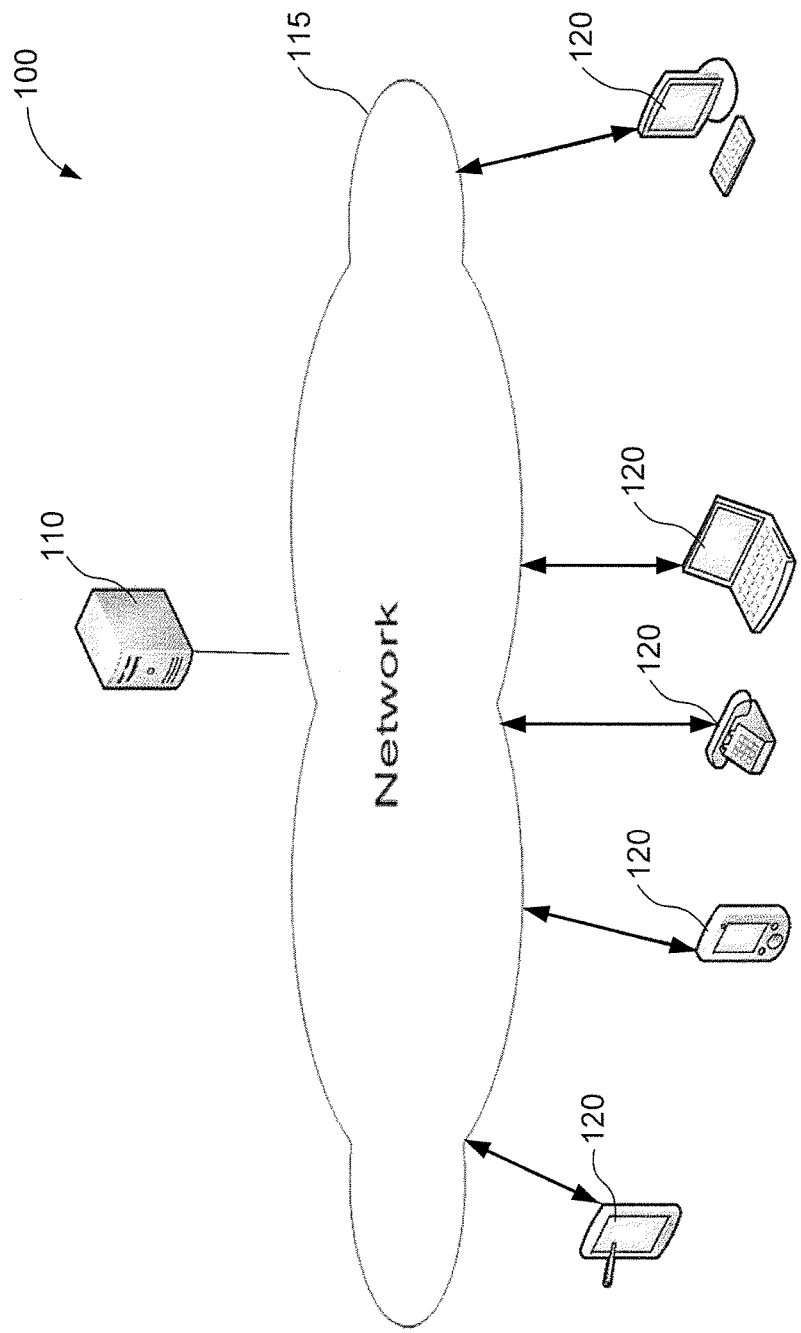
FIG. 1 is a simplified diagram illustrating an electronic communications system in which various implementations described herein may be practiced.

FIG. 1 shows an example of an electronic communications system 100 in which various implementations of disclosed embodiments are practiced. Electronic communications system 100 can be, for example, a telephony system such as a hosted Private Branch Exchange (PBX) platform that provides voice and/or video over IP, fax services, etc. Electronic communications system 100 may include a plurality of communications devices, such as, a server 110 and one or more terminal devices 120 operatively connected to a communications network 115. Server 110 may be communicatively coupled with terminal devices 120 by one or more communications links (described below) of network 115 and may manage one or more communications sessions between different terminal devices 120. The term "server" refers to a device having storing and processing capabilities. The term "communications session" refers to any one-way or two-way exchange of information between two or more electronic communications devices such as terminal devices 120. A communications session may include data, voice, video, and multimedia communications sessions, or any other type of data exchanges, for example, text messaging. Server 110 may include or be connected to various network computing resources (for example, servers, routers, switches, network connections, storage devices, etc.) necessary to support the services provided by electronic communications system 100. In one example, server 110 may be a generic server that provides services, such as emails, chats, and voice and/or video over IP services. In another example, server 110 may be a dedicated server for providing recipients with information regarding communications sessions.

FIG. 1 further shows different types of terminal devices 120. Terminal devices 120 represent electronic communications devices that can communicate with each other and/or with server 110. Terminal device 120 may include, for example, a smartphone; wearable devices such as a smartwatch or smartglasses; a tablet; an e-Reader; a laptop; a desktop computer; a voice over Internet Protocol (VoIP) phone; a teleconferencing device; a videoconferencing device; a set top box; a gaming console; etc. Reference below to specific types of terminal devices should not be construed to limit the scope of the present disclosure.

Consistent with embodiments of the present disclosure, server 110 provides services to corresponding users or subscribers associated with terminal devices 120. It is noted that the terms "user," "subscriber," "caller," "callee," and "recipient" are used in the interest of brevity and may refer to any of a variety of entities that may be, for example, a person, an organization, an organizational role within an organization, a group within an organization, etc. For example, a user may be a caller in a voice dialing or video conferencing system, or a network subscriber sending a text message in a text messaging application. A recipient may be a callee in a voice dialing or video conference system, or a network subscriber receiving a text message in a text application.

In some embodiments, a user may use terminal device 120 to initiate different types of communications sessions with one or more participants. For example, terminal device 120 may be used to transmit or receive different types of data or messages (e.g., audio messages, video messages, or text messages) to or from server 110. As mentioned above, server 110 and the terminal devices 120 are communicatively coupled via a plurality of communications links of network 115. It is understood that any data transmission may occur in cooperation with network 115, which herein refers to any or all of the systems involved in providing between two or more communications devices. For example, communications network 115 may include, without limitation, a cellular telephone system, the Internet, a satellite communication system, wide area network (WAN), local area network (LAN), wireless local area network (WLAN), virtual network, or telecommunications network. The communications links may be wired, wireless, or both, and may be dynamically assigned based on the type of communications session and the load in each communications link. For example, a communications session between terminal device 120 and server 110 may start using cellular link and once the user in proximity to a known WLAN access point, it may continue using a WLAN link.

Figure 2:
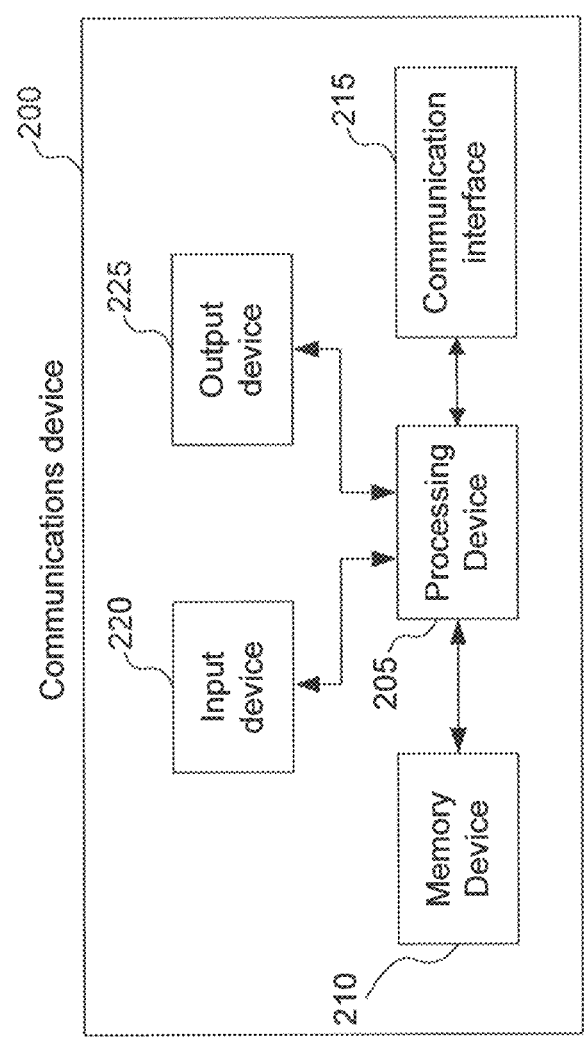
FIG. 2 is a block diagram illustrating the components of an electronic communications device that may be used in conjunction with the electronic communications system of FIG. 1.

FIG. 2 illustrates the components of an example electronic communications device 200. The term "electronic communications device" refers to any device configured to transmit and receive data by wired or wireless transmission. For example, electronic communications device 200 may include, but is not limited to, server 110 and terminal device 120. Electronic communications device 200 may comprise a bus or any other communication mechanism for interconnecting subsystems and components. As shown in FIG. 2, electronic communications device 200 includes a processing device 205, a memory device 210, a communication interface 215 (for example, a modem, Ethernet card, or any other interface configured to exchange data with a communications network), an input device 220 (for example, keyboard, touch screen, a microphone, a camera), and an output device 225 (for example, a speaker or a display). The various components in electronic communications device 200 may be coupled by one or more communication buses or signal lines. One skilled in the art will appreciate that the configuration of electronic communications device 200 may have numerous variations and modifications. Some electronic communications devices 200 may include additional components (e.g., a power source, a GPS, and various sensors), while other electronic communications devices 200 may include fewer components (e.g., no output device 225). The configuration shown in FIG. 2 should not be considered essential for the operation of electronic communications device 200.

Processing device 205, shown in FIG. 2, executes computer programs, applications, methods, processes, or other software to perform embodiments described in the present disclosure. The term "processing device" refers to any physical device having an electric circuit that performs a logic operation. For example, the processing device may include one or more integrated circuits, microchips, microcontrollers, microprocessors, all or part of a central processing unit (CPU), graphics processing unit (GPU), digital signal processor (DSP), field programmable gate array (FPGA), or other circuits suitable for executing instructions or performing logic operations. In some embodiments, processing device 205 may be associated with a software product stored on a memory device 210 or a non-transitory computer readable medium. As used herein, a non-transitory computer-readable storage medium refers to any type of physical memory on which information or data readable by at least one processor can be stored. Examples include random access memory (RAM), read-only memory (ROM), volatile memory, nonvolatile memory, hard drives, CD ROMs, DVDs, flash drives, disks, and any other known physical storage medium. The terms "memory" and "computer-readable storage medium," may refer to multiple structures, such a plurality of memories or computer-readable storage mediums located at electronic communications device 200 or at a remote location. Memory device 210 or a computer-readable storage medium can store instructions for execution by processing device 205, including instructions for causing the processing device 205 to perform steps consistent with embodiments of the present disclosure herein.

Figure 3:
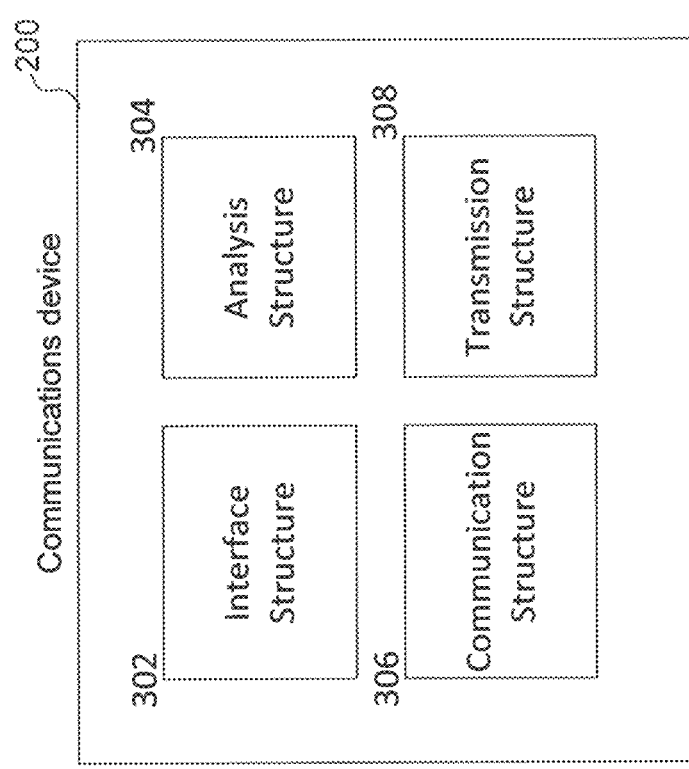
FIG. 3 is a block diagram of structures configured to perform one or more operations, consistent with the disclosed embodiments.

FIG. 3 is a block diagram illustrating structures configured to perform one or more operations, consistent with the disclosed embodiments. As shown in FIG. 3, electronic communications device 200 further includes an interface structure 302, an analysis structure 304, a communication structure 306, and a transmission structure 308. The structures may be coupled by one or more communication buses or signal lines. The disclosed embodiments are not limited to any particular configuration of electronic communications device 200. In some embodiments the structures of FIG. 3 may be part of processing device 205.

Figure 6:
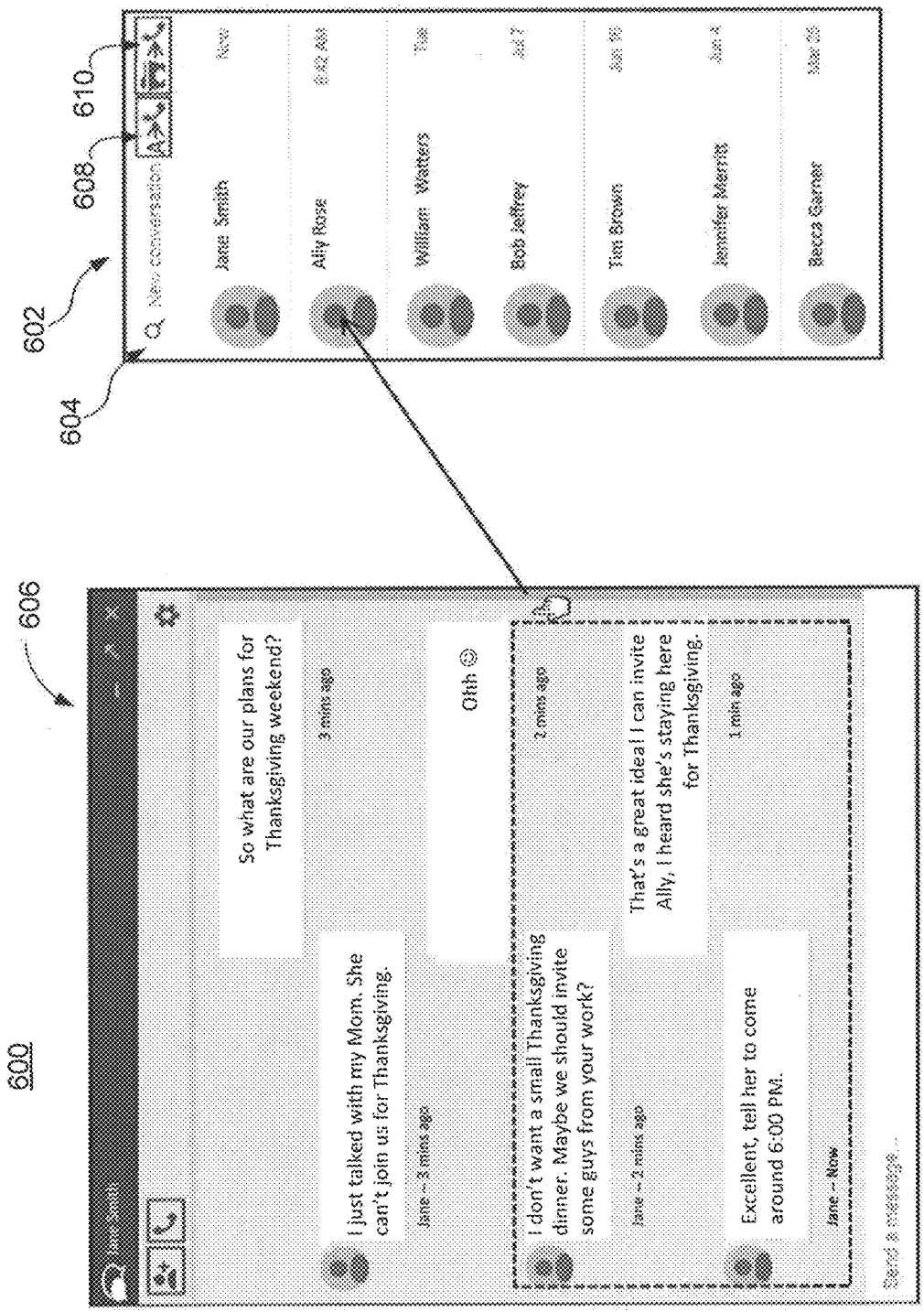
FIG. 6 is a screen shot illustrating an example graphical user interface (GUI) feature for initiating a communications sessions according with embodiments of the present disclosure.

In one embodiment, interface structure 302 receives from a user an input selection for use in connection with a communications session. The input selection may include selection of content (e.g., a document, an email, information on a website, and more) and selection of contact information (a username, a phone number, and more). One example of a GUI implemented in electronic communications system 100 is illustrated in FIG. 6. Analysis structure 304 determines information based on selected content. In some embodiments, the determined information may be regarding a previous exchanged communication session. This information may include descriptive information or information from (or derived from) the previous exchanged communication session. It may be associated with a subject line, a title, or a summary, for example. Analysis structure 304 may analyze the selected content as the input selection is being received, or after receipt of the input selection.

Consistent with some embodiments, analysis structure 304 may use linguistic analysis techniques to analyze and determine the descriptive information of the selected content. The linguistic analysis techniques may be those known in the art, such as semantic-based voice or text recognition, vector space analysis, rule-based analysis, statistical analysis, or other known techniques. In one embodiment, analysis structure 304 recognizes individual words, phrases, and sentences in the selected content, based on voice recognition techniques or Optical Character Recognition (OCR) techniques. Analysis structure 304 then determines the descriptive information of the selected content by applying natural language processing techniques to the recognized words, phrases, and sentences. For example, analysis structure 304 may determine the subject of selected content based on the identified words, phrases, and/or sentences.

Consistent with other embodiments, analysis structure 304 may observe details from metadata information associated with the selected content, and use these details in determining the descriptive information. In one example, when the selected content is a file or a document, the selected content may already contain descriptive information stored in a dedicated structure (e.g., a title field) as part of the file format. The retrieved details may be used as at least part of the descriptive information. In another example, when the selected content may be an HTML document, the HTML document structure may support a title tag that provides a meaningful indication of the nature of the document's contents. Furthermore, HTML document formats often support other metadata information, such as keyword and description meta tags. Therefore, according to some embodiments, analysis structure 304 may retrieve such information when the selected content is a document or file whose format supports descriptive information and that contains such information.

In some embodiments, analysis structure 304 may convert the format and/or size of the selected content to derive the associated descriptive information. For example, when the selected content is a document and the descriptive information is a subject line of an email correspondence, determining the descriptive information may include converting the formatting of the document to a predefined format, identifying key terms in the document, selecting one or more key terms, composing a subject line from the selected key terms.

In other embodiments, analysis structure 304 may derive the associated descriptive information from multimedia content such as images, audio information, as well as the video information. For instance, analysis structure 304 may analyze audio information as well as video information of a selected portion of a video message to determine the content and context of the video message. For the audio information, analysis structure 304 may apply the linguistic analysis techniques as discussed above, and for the video information, analysis structure 304 may apply image analysis techniques known in the art, such as image filtering, computer vision, pattern recognition, etc. Accordingly, based on the analysis of the video information, analysis structure 304 may identify a face of the person in the video, a motion of the person in the video, a background of the video, etc. The identified audio information and video information may be used by analysis structure 304 to determine the descriptive information of the video message. For example, electronic communications device 200 may use a camera (as input device 220) to initiate a communications session about something that the user can see, such as a skilled worker in the field diagnosing a problem with some machinery or electrical wiring. The user may point the camera of electronic communications device 200 at the subject of his or her investigation and then elect to communicate with a peer or supervisor about what their camera captures. Analysis structure 304 may treat the captured image data as the selected content and use computer vision to identify the objects or structure that are being captured. Thereafter, analysis structure 304 may use the identified objects or structure in the image data to determine the descriptive information.

In some embodiments, the analysis structure 304 determines the urgency or importance of the selected content. For example, the analysis structure 304 determines that a selected content relating to a portion of a chat exchange between various participants includes a task that requires an immediate response, and includes the urgency level for completion of the task in the subject line of an email correspondence sent, for example by the transmission structure 308, to a device 120 associated with a user tasked with completion of the request. In some example embodiments, the urgency or importance level is presented as a notification displayed on device 120.

Communication structure 306 initiates a communications session with at least one terminal device associated with a particular recipient, based on contact information associated with the input selection. The term "contact information" refers to any information that corresponds to the particular recipient and that may be considered relevant for contacting, accessing, or communicating with the particular recipient. Examples of contact information may include one or more of the following: a name, an image, a phone number, a fax number, a mobile phone number, an email address, user names in different services, an IP address, and more. In some embodiments, memory device 210 stores the contact information, which may include a plurality of profiles associated with the same user. Additionally, communication structure 306 may retrieve at least part of the contact information from other sources, such as other devices in communication with communications network 115 or a contact database. For example, communication structure 306 may receive the contact information from a social network account (for example, Facebook® or LinkedIn®) of the same user. In this case, communication structure 306 may compile a combined contact list based on the contact information retrieved from different sources.

Transmission structure 308 transmits data, including the determined information, to the at least one terminal device associated with the particular recipient. For example, the transmitted data may include descriptive information of selected content such as previously exchanged communication(s). The transmitted data may also include at least one detail regarding an additional communications session between the user and the particular recipient. Consistent with the present disclosure, the transmitted data may help the particular recipient understand the user's purpose in initiating the additional communications session.

Figure 4:
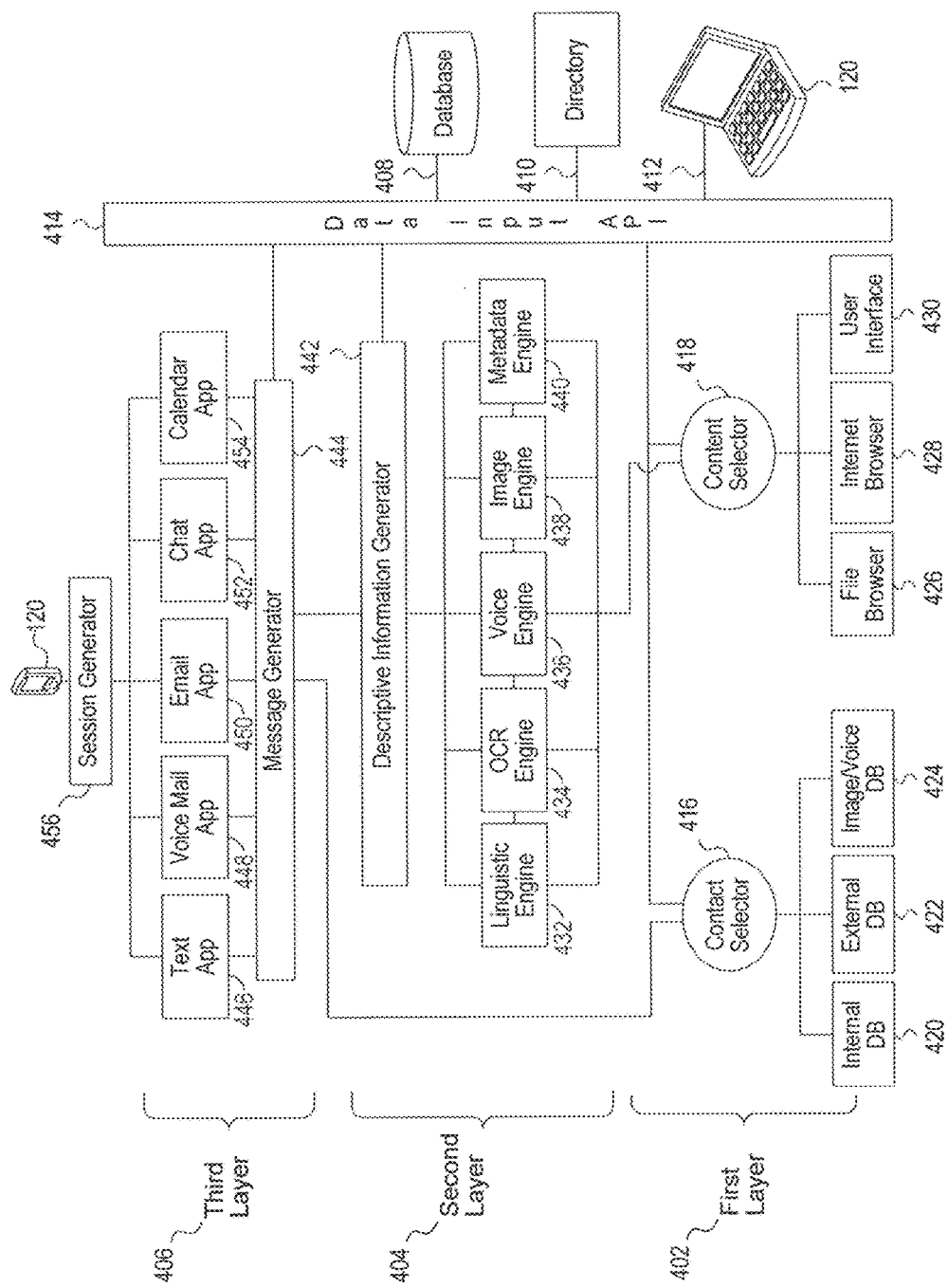
FIG. 4 is a block diagram illustrating an example framework that may be used in conjunction with the electronic communications system of FIG. 1.

FIG. 4 illustrates an example framework consistent with disclosed embodiments. In this example, the framework is an architectural organization that can be implemented in software, hardware, or a combination thereof. The framework allows a user to select content and a recipient, and provides descriptive information of the selected content to the selected recipient. The framework consists of three layers: a first layer 402, a second layer 404 and a third layer 406. The first layer 402 manages the user input selection. The second layer 404 manages the determination of the descriptive information. The third layer 406 manages the transmission of the descriptive information to the selected recipient. All three layers can accept data inputs 408, 410, 412 from the user through a data input application programming interface (API) 414. Examples of GUIs illustrating how the framework may be implemented are provided with reference to FIGS. 6-19 as later described herein.

First layer 402 includes a contact selector 416 that manages the selection of one or more recipients. Contact selector 416 may have access to an internal contact database 420, an external contact database 422, and an image/voice database 424. After receiving an input selection from the user, contact selector 416 accesses databases 420, 422, and 424 to identify one or more communication means associated with the selected recipient (e.g., phone number, email address, user name, and more). Contact selector 416 may send the one or more communication means to a message generator 444 in third layer 406.

First layer 402 may also include a content selector 418 that manages the selection of the content. Content selector 418 may have access to a file browser 426, internet browser 428, and user interface 430. In one example, content selector 418 may use file browser 426 to identify the selected content. The term "selected content" refers to any type of information representable in electronic form. Examples of selected content may include information from a document, information from a Web page, information from a spread sheet, an image, a calendar event, a text file, an audio file, a video file, a uniform resource locator (URL), and more. Content selector 418 may direct the selected content to one or more engines in second layer 404 based on the type of the selected content.

In second layer 404, descriptive information may be determined from the selected content. The selected content may enter to one or more of the following engines: a linguistic engine 432, an OCR engine 434, a voice recognition engine 436, an image recognition engine 438, and a metadata retrieval engine 440. In one embodiment, the selected content passes through one or more engines. For example, assuming the selected content is a portable document format (PDF) file with pictures and writing. Metadata retrieval engine 440 may identify the person who created the PDF file, image recognition engine 438 may recognize the identity of the people in the pictures, OCR engine 434 may process the writing into readable text, and linguistic engine 432 may recognize individual words, phrase, and sentences in the PDF file. The information output from one or more of the engines may be entered to a descriptive information generator 442. In one embodiment, descriptive information generator 442 may prioritize the information according to predetermined rules (e.g., include the identity of the person who created the document only if he/she is included in the user's contacts list) and select the descriptive information to send to message generator 444. In another embodiment, descriptive information generator 442 may receive a feedback from the user regarding the information to send the selected recipient.

Third layer 406 includes message generator 444 that assemble and forward the descriptive information to the selected recipient using one or more of the following applications: a text application 446, a voicemail application 448, an email application 450, a chat application 452, a notification, and a calendar application 454. Message generator 444 may use the information received from contact selector 416 regarding the selected recipient's communication means. In addition, message generator 444 may receive a feedback from the user regarding which application to use for transmitting the descriptive information. Alternatively, message generator 444 may obtain a preferable communication mode from internal database 420 that stores contact information. After the message is transmitted, a session generator 456 may (automatically or after receiving indication from the user) initiate a communications session with the selected recipient.

In one embodiment contact selector 416 may use information retrieved by content selector 418 to provide a recommended list of potential contacts for a communications session about a selected content. For example, a user may have questions about a certain document selected using file browser 426, but the user may not know who would be the best person to discuss with about the document. Therefore, upon receiving an indication (e.g., activating a designated button, highlighting specific text, selecting a document, and more) from the user, contact selector 416 may access databases 420, 422, and 424 to provide the user with a list of potential recipients. In one example, internal database 420 may store information about who may have the best knowledge of the subject of the selected content. In some embodiments, the user may invoke a contextual menu for the selected item (e.g., a Web page, a document, and more). The contextual menu may include an option for "contacts recommendation." Upon activating this option contact selector 416 may recommend the user one or more potential contacts with whom to discuss the item.

In a related embodiment, contact selector 416 may determine which contacts to include in the recommended list based on information derived by engines 432-440. In one example, where the selected content is a document, metadata engine 440 may identify one or more individuals that have participated in the creation, editing, or reviewing of the document. Metadata engine 440 may also identify the individuals that have accessed or read the document most recently/frequently and/or thoroughly. In a different example, when the selected content is a document being versioned in a source control system, contact selector 416 can recommend users with whom to communicate about the document based on the commit history for the document, and even commits relating to a specific selected portion of the document.

In yet another related embodiment, message generator 444 may determine a preferred mode of communication to use when initiating a communications session with the selected contact based on the information derived by engines 432-440. In one example, where the selected content is a video stream captured by a camera of the terminal device 120, image recognition engine 438 may identify an object or an individual in the data stream. Accordingly, message generator 444 may initiate a video chat with the selected contact, and send to the selected contact a short video with the identified object or an individual. Additionally, message generator 444 may adjust the preferred mode of communication to use with the selected contact based on information on the selected contact. For example, if contact selector 416 determines that the selected contact is not available to a video chat or generally prefers not to have video chats, message generator 444 may initiate a phone call with the selected contact, and send to the selected contact an image of the identified object or an individual.

The preceding disclosure about the framework of FIG. 4 is explanatory by nature and various modifications and changes may be made thereto. In some embodiments, the framework may be adapted to be implemented by electronic communications device 200.

Figure 5:
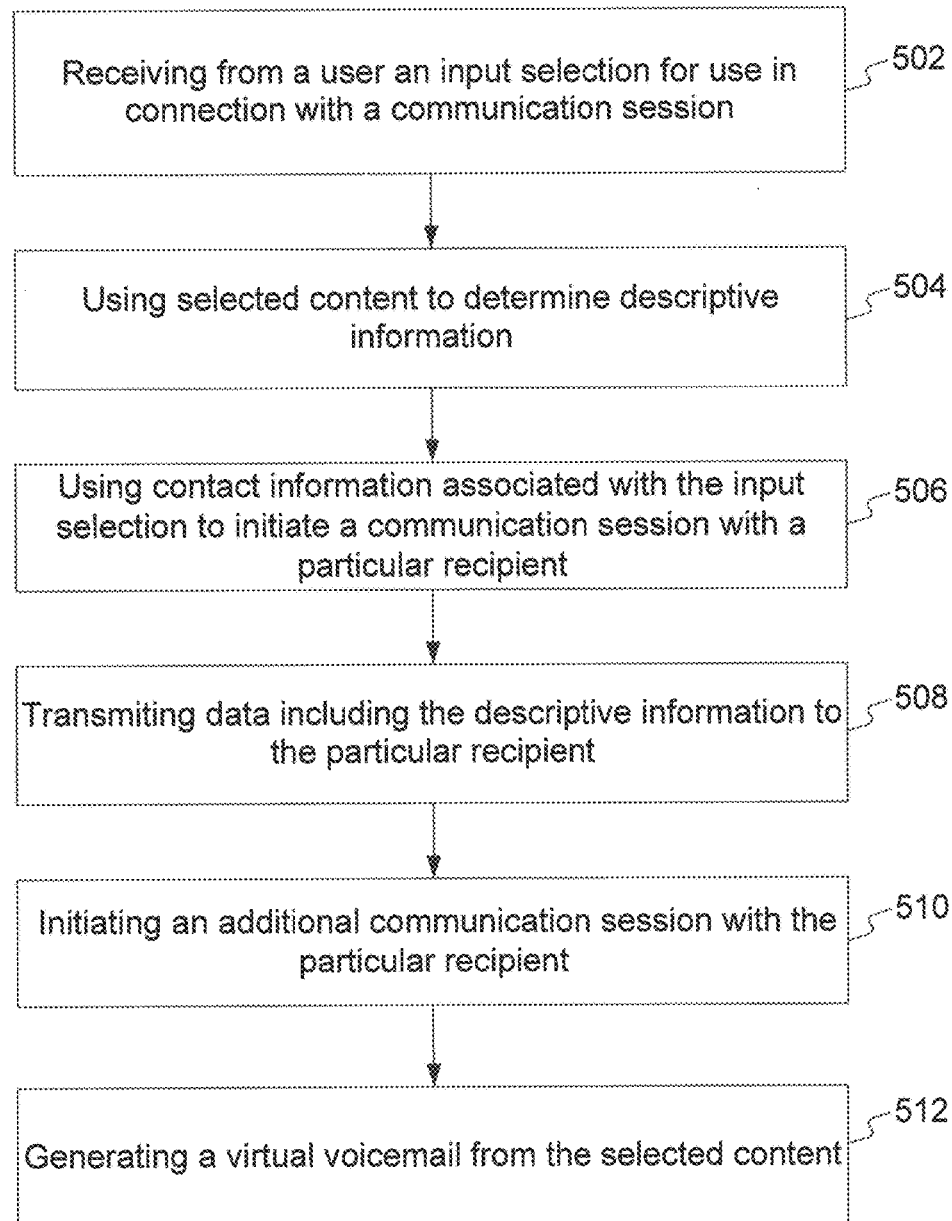
FIG. 5 is a flow chart illustrating an example process for providing descriptive information, in accordance with embodiments of the present disclosure.

FIG. 5 depicts an example process 500 for providing recipients with descriptive information regarding communications sessions, in accordance with example embodiments of the present disclosure. The steps of process 500 may be performed by electronic communications device 200 of FIG. 3, which may be server 110 or one or more terminal devices 120 depicted in FIG. 1. In the following description, reference is made to certain components of FIGS. 1 and 2 for purposes of illustration. It will be appreciated, however, that other implementations are possible and that other components may be utilized to implement the example method.

At step 502, the communications device 200 receives from a user an input selection for use in connection with a communications session. The input selection may include selection of content and selection of contact information. The following description of an example scenario, which is also illustrated in FIG. 6, serves to explain different aspects of process 500: User John Smith chats with his wife Jane Smith about their plans for the holiday weekend. Thereafter, John wants to invite his coworker Ally Rose for a holiday dinner. In some embodiments, the received input selection may include dragging a selected content and dropping it on an icon representing a contact. For example, John may select a related chat snippet (e.g., the portion of the chat about a holiday dinner) and drop it on an icon representing the user Ally. In some embodiments, the input selection may further include a selection of a type of the communications session. For example, dropping the selected content on the icon of Ally may cause a pop-up menu of options to display. The option includes different types of communications sessions, such as initiate a chat session, initiate a phone call, send an e-mail, send an SMS and/or MMS, etc. In this way the user John may select to send Ally a text message to her terminal device 120.

As mentioned above, process 500 may be executed by server 110 or by terminal device 120. When step 502 is carried out by server 110, for example, receiving the input selection may include receiving the input selection from terminal device 120 associated with the user. For example, server 110 may receive data reflecting the input selection from terminal device 120 via communications network 115. While, when step 502 is carried out by terminal device 120, receiving the input selection may include receiving the input selection from input device 220. For example, terminal device 120 may receive signals reflecting the input selection from a touchscreen. At step 504, electronic communications device 200 may use selected content to determine descriptive information. In some embodiments, the selected content may be associated with another communications session with a different recipient that may be attached or appended to selected content. For example the selected content may include one or more of the following: an email, a voicemail, and a chat snippet. In the example scenario above, the selected content to be used in determining the descriptive information for Ally was a chat snippet between John and Jane.

In some embodiments, the selected content may be previously stored at memory device 210. Alternatively, when electronic communications device 200 receives the input selection, the selected content may be stored at memory device 210. In some embodiments, the selected content may be used to determine descriptive information. The term "descriptive information" may refer to any form of data derivable from the selected content that includes one or more details describing the selected content. The following non-limiting examples illustrate possible connections between the selected content and the descriptive information: when the selected content is a document, the descriptive information may be a summary of the document; when the selected content is an email, the descriptive information may be a subject line and an associated date; when the selected content is a voicemail, the descriptive information may be a transcript of the voicemail; and, when the selected content is a chat snippet, the descriptive information may be a title and the identity of the participants in the chat; when the selected content is a calendar invitation, the descriptive information may be the subject of the meeting; and when the selected content is a video file, the descriptive information may be part of the video played back at a higher speed. In the example scenario above, where the selected content was a chat snippet between John and Jane, the descriptive information may be "Holiday dinner invitation."

At step 506, electronic communications device 200 uses contact information associated with the input selection to initiate a communications session with at least one terminal device 120 associated with a particular recipient. The input selection may include a selection of the type of communications session. The type of communications session may be a video communications session, an audio communications session, a textual communications session, or a combination thereof. In addition, the type of communications session may include the type of service used for initiating the communications session. For example, a textual communications session may be initiated via any of the following services: email, cellular text message, WhatsApp Messenger, Facebook chat, Google Hangout, and more. In other embodiments the type of communications session being initiated may be determined by presence information of the particular recipient. Presence information may be determined by obtaining presence information from one or more presence services. The presence services can include a communication application, a social network service, a professional network service, and/or a presence module of the various mobile applications. In the example above, when John places (e.g. drops) the selected content on Ally's icon he selects her as the particular recipient and electronic communications device 200 initiates a chat session with Ally because the presence information indicate that Ally in currently using her desktop computer.

At step 508, electronic communications device 200 may transmit data including the descriptive information to the particular recipient. The format of the descriptive information being transmitted may depend on the type of the communications session and/or the presence information. The format of the descriptive information may include a visual format (e.g., plain text), audio format (e.g., narrated text), or other types of format. For example, if Ally's presence information indicates that she is currently driving the descriptive information may be transmitted in an audio format. In some embodiments, the transmitted data includes the descriptive information and/or at least one detail regarding an additional communications session between the user and the particular recipient. The at least one detail may include the name of the user, the type of communications session, a timing indicator, or any other detail related to the additional communications session. In the example scenario above, after John dropped the selected content on Ally's icon, Ally may receive the notification message: "John Smith is about to call about: Holiday dinner invitation."

Consistent with embodiments of the present disclosure, the data may be transmitted to at least one terminal device 120 associated with a particular recipient. In some cases, the particular recipient may have more than one terminal device 120, for example, a smartphone and a desktop computer. Accordingly, electronic communications device 200 may be configured to transmit the data to some or all of the terminal devices 120 associated with the particular recipient. For example, electronic communications device 200 may transmit the notification message both to Ally's smartphone and computer. In some embodiments, electronic communications device 200 may be configured to initiate the communications session with a first terminal device 120 associated with the particular recipient and to initiate the additional communications session with a second terminal device 120 associated with the particular recipient. For example, electronic communications device 200 may transmit the notification message to Ally's computer, and initiate a phone call with Ally's smartphone. In other examples, the descriptive information can be broadcasted to plurality of recipients.

Communications device 200 may, in some embodiments, initiate the additional communications session with the at least one terminal device 120 associated with the particular recipient (step 510). With the benefit of the previously transmitted descriptive information, the additional communications session may take place when the particular recipient knows the user's purpose in initiating the communications session. Therefore, the particular recipient may be able to direct the additional communications session to another person's associated device 120, a person who would be more appropriate for the subject matter of the call.

In some embodiments, electronic communications device 200 may initiate the additional communications sessions, upon receiving confirmations from particular recipients that they are ready for the additional communications sessions. In other embodiments, electronic communications device 200 may initiate the additional communications session automatically upon receiving a confirmation that the at least one terminal device 120 received the descriptive information. Alternatively, electronic communications device 200 may receive an indication (e.g., from an element in communications network 115) for non-delivery of the data that includes the descriptive information (e.g., a failure of an attempt to deliver the notification message, or an expiration of a time period for making attempts to deliver the notification message). By receiving such indication, the electronic communications device 200 may postpone initiating the additional communications session and retransmit the data that includes the descriptive information. In other embodiments, electronic communications device 200 may initiate the additional communications session automatically upon receiving a confirmation that the particular recipient had opened the descriptive information. For example, electronic communications device 200 may send the particular recipient a notification message that includes the descriptive information using a service that can provide confirmations after recipients open their messages.

As mentioned above, users may use electronic communications device 200 to initiate communications sessions of different types. In some embodiments, the communications session including the descriptive information may be a first type of communications session and the additional communications session may be a second type of communications session. For example, electronic communications device 200 may send the notification message as a text message to Ally informing her that John is about to contact her about a holiday dinner, and then to initiate a video chat with Ally's smartphone terminal device 120. In other embodiments, electronic communications device 200 may initiate the communications session and the additional communications session concurrently. Such that the notification message may be provided to the particular recipient substantially at the same time when the particular recipient receives the request for a communications session. For example, Ally may receive a phone call from John, and together with the indication that John is calling, Ally's smartphone may indicate that John is calling about a holiday dinner invitation.

At step 512, electronic communications device 200 may use the selected content to generate a virtual voicemail. In one example, the virtual voicemail may be generated by synthesizing voice audio from the text of the descriptive information using known text-to-speech technologies. A virtual voicemail may be useful when the particular recipient does not answer the attempt to initiate a communication session, or when the user prefers to send an automated audio message instead of a text message. In some embodiments, the virtual voicemail may be generated from the text of the descriptive information (e.g., the subject of the communication session). In other embodiments, the virtual voicemail may be generated from the selected content itself (e.g., a narrated version of the chat snippet). In the example scenario above, if Ally does not answer her phone, electronic communications device 200 may receive a voicemail stating that John called about a holiday dinner invitation.

Further to the example scenario above, when Ally accesses or reviews her voicemail through an audio interface, the descriptive information may be converted to audio using known text-to-speech synthesis technologies. Alternatively, when Ally accesses or reviews her voicemail through a text interface, the descriptive information can simply be displayed as text (such as a banner or a notification) on a display of the terminal device 120. In addition, the descriptive information associated with the intended call may be displayed as supplemental information along with other details for a missed call. Having virtual voicemail messages derived from automatically generated text may be easier and more reliable than transcribing regular recorded audio voicemail using speech-to-text technologies.

Figure 15:
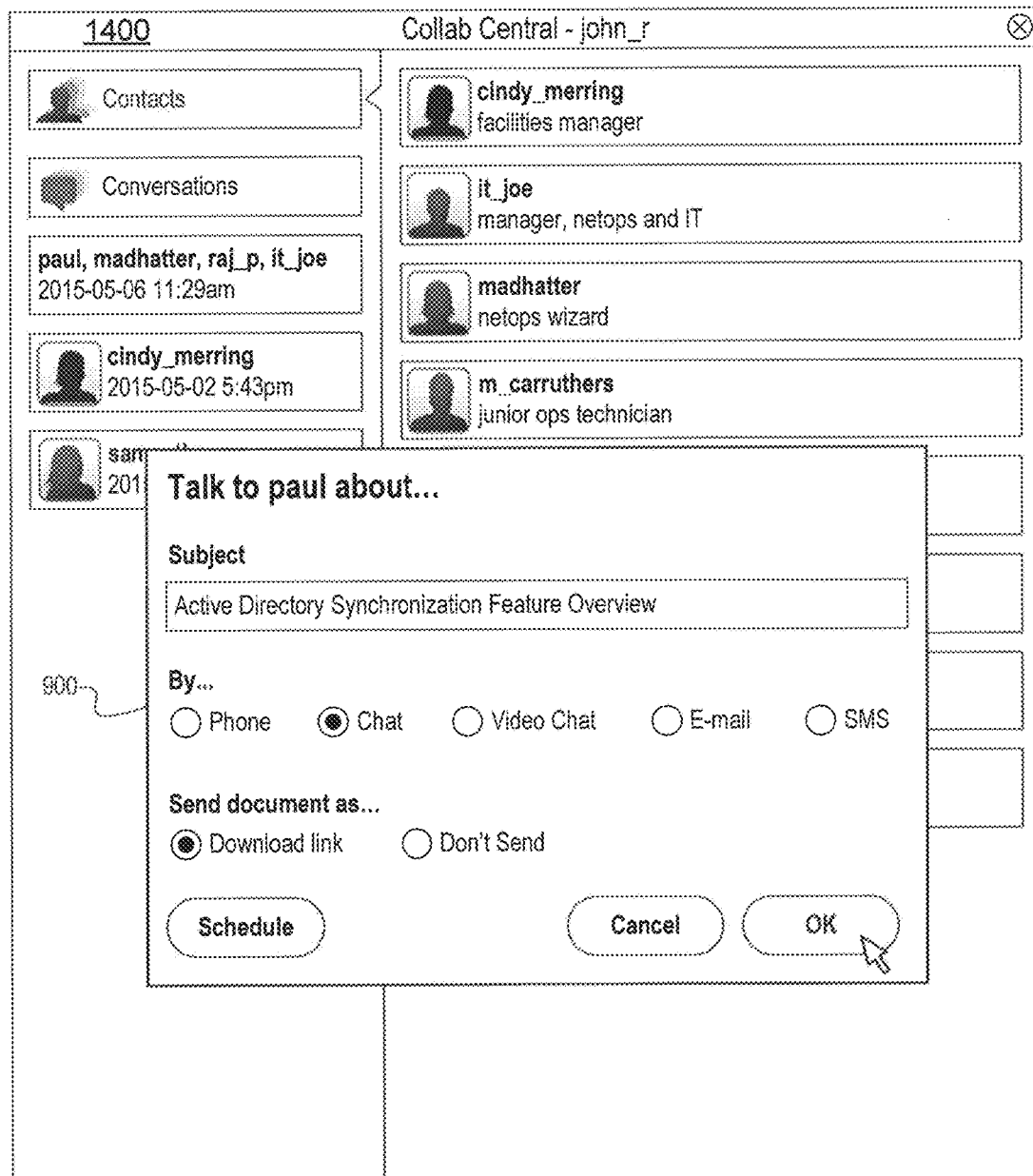
Figure 16:
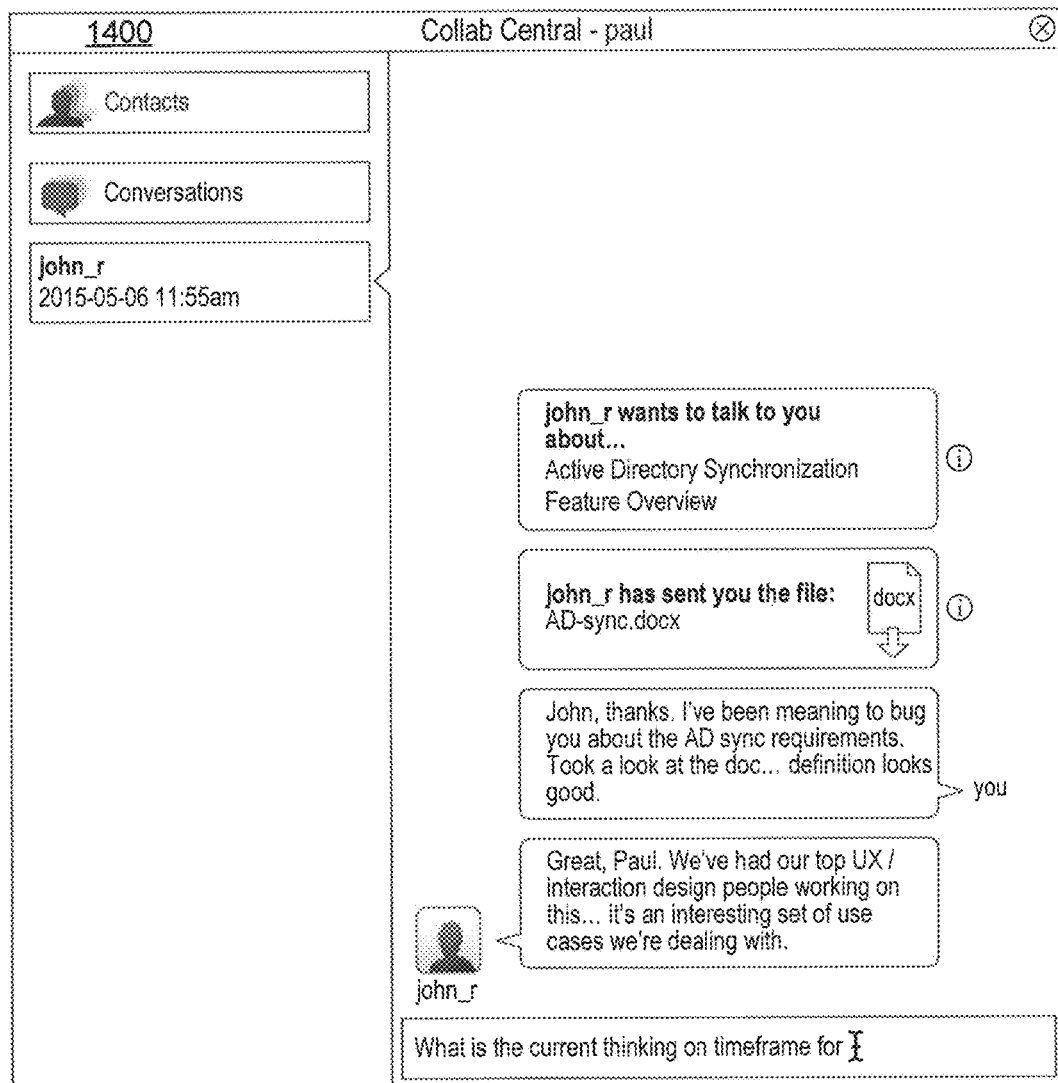
Figure 17:
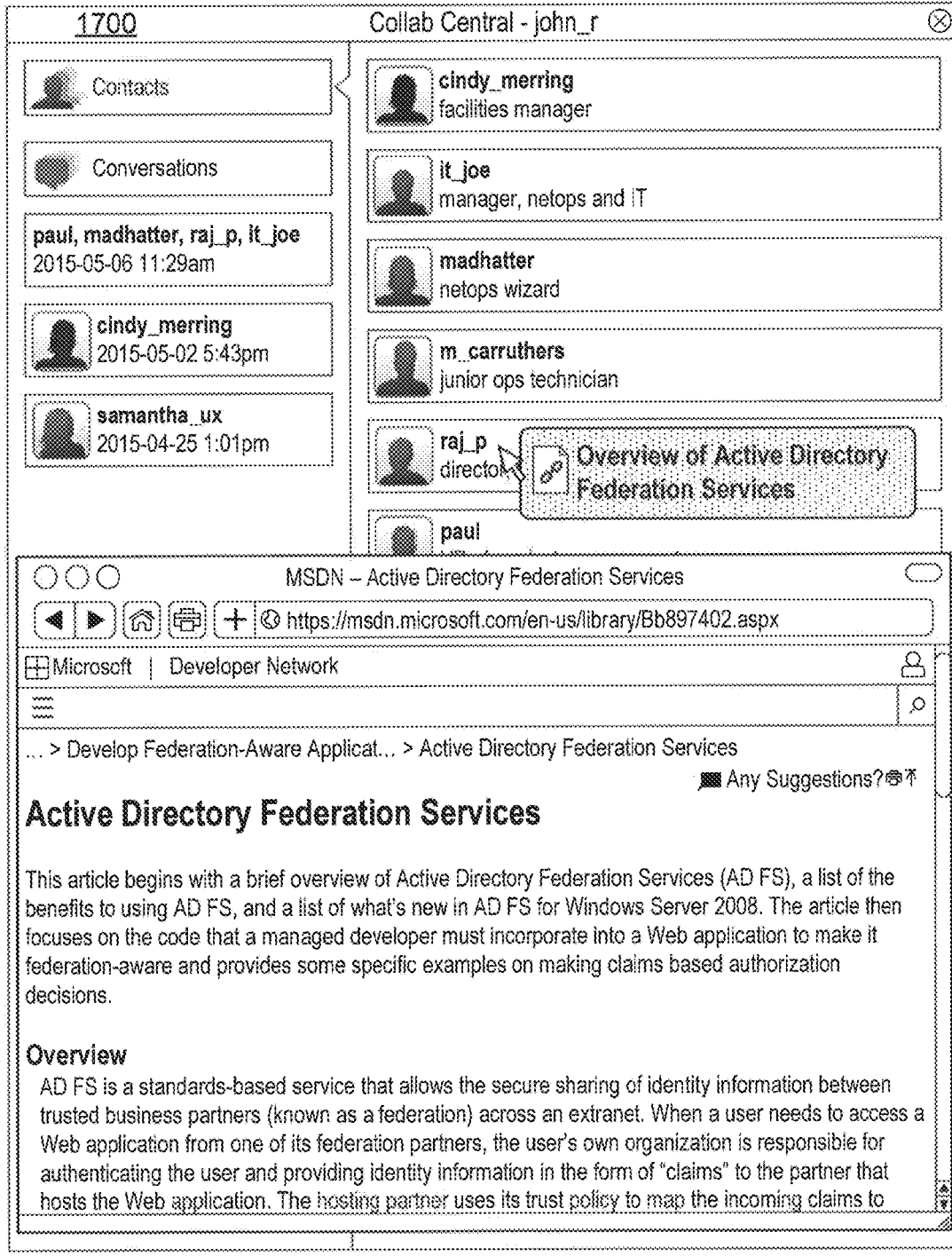
Figure 18:
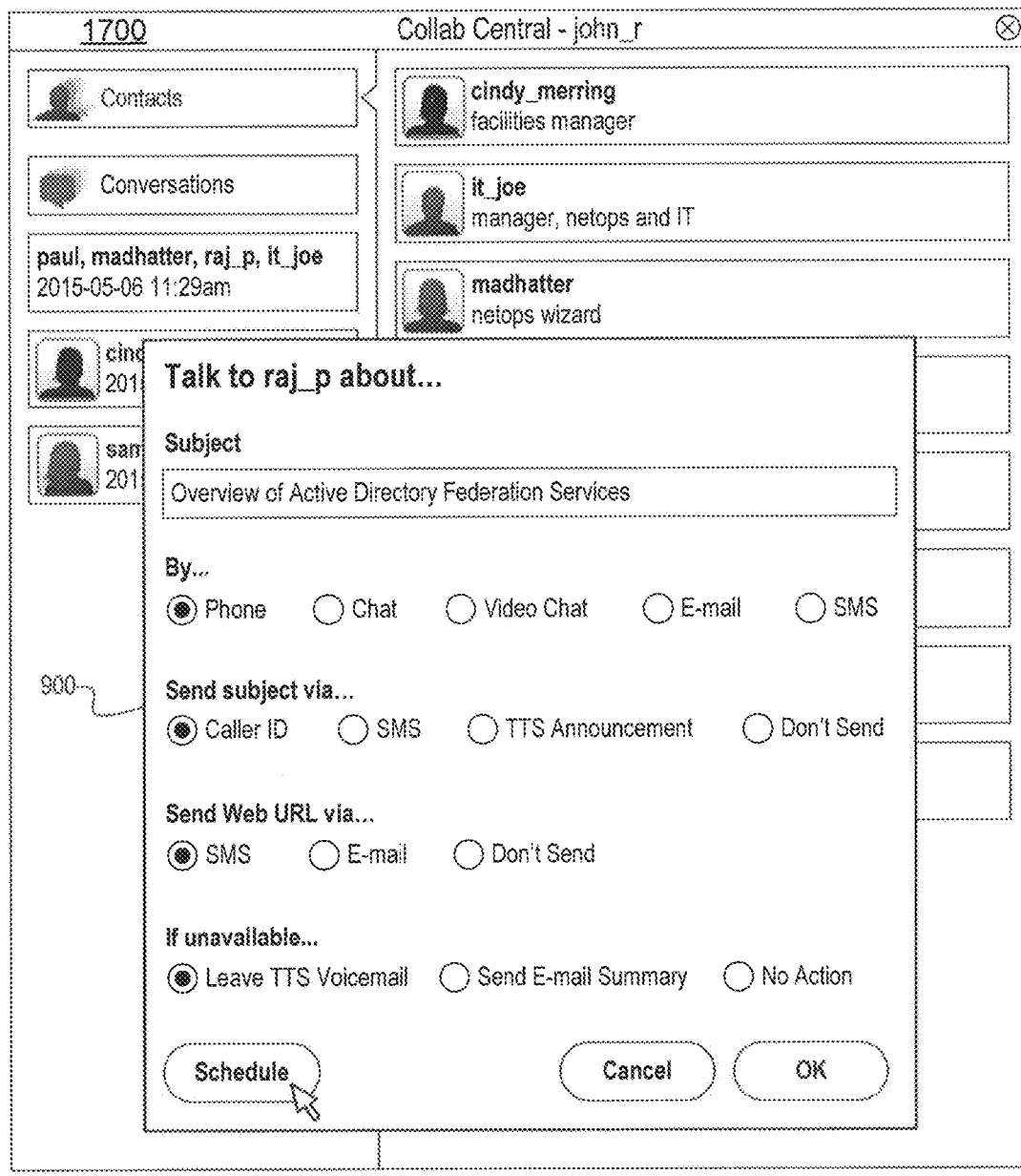
Figure 19:
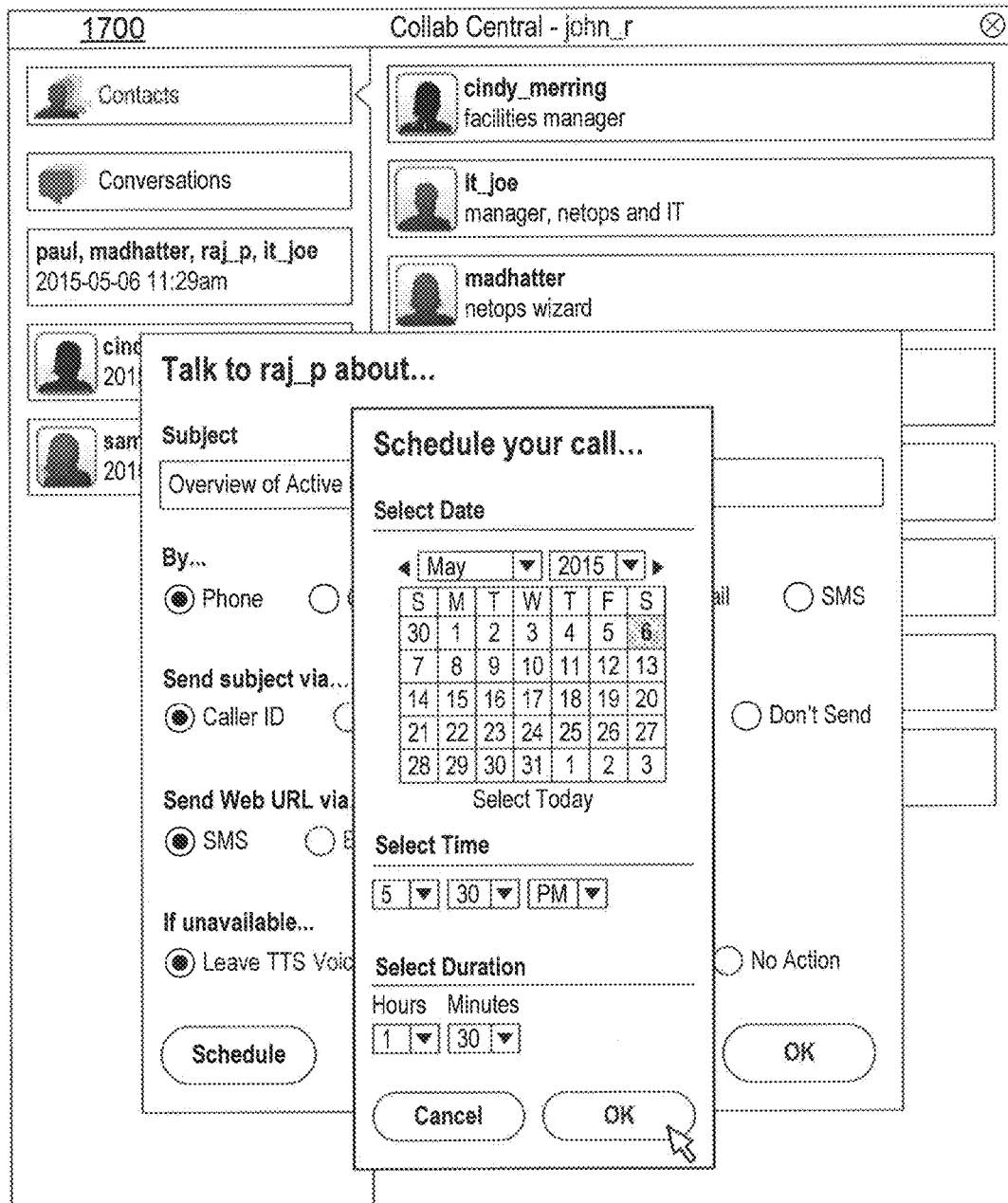

FIGS. 6-19 depict different types of GUI features according to embodiments of the present disclosure. The GUI features may be implemented in electronic communications system 100 of FIG. 1 for providing recipients with descriptive information. FIG. 6 depicts a first example of a GUI feature that illustrates the example scenario described above with reference to FIG. 5. FIGS. 7-13 depict a second example of a GUI feature that illustrates how user john_r can initiate communication sessions with user veeru_kumar when the selected content is a chat snippet. FIGS. 14-16 depict a third example of a GUI feature that illustrates how user john_r can initiate communication sessions with user paul when the selected content is a document. FIGS. 17-19 depict a fourth example of a GUI feature that illustrates how user john_r can initiate communication sessions with user raj_p when the selected content is a Web page. According to some embodiments, the GUI features may be generated by server 110 for display at terminal device 120 associated with the user. Alternatively, the GUI features may be generated by terminal device 120 associated with the user. The user's terminal device may present the GUI features through output device 225 (e.g., a display) and interacts with the user through the GUI features as disclosed herein.

First Example of GUI

FIG. 6 depicts a GUI feature 600 based on the example scenario described with reference to FIG. 5. GUI feature 600 may include a contacts window 602 having a search field 604 for the user to specify a name of contact to chat with. The user may also select a contact directly from the list of contacts. In the example shown in FIG. 6, the user had previously selected to chat with Jane Smith. Upon the user selection, a chat window 606 was opened in which the user can communicate with the selected contact. GUI feature 600 may receive user input for the chat messages through input device 220 (e.g., a keyboard, a touch screen, or microphone). In some embodiments, GUI feature 600 may further include a contextual menu that includes a "text-to-call" button 608 and a "file-to-call" button 610.

When the user activates "text-to-call" button 608 by selecting the icon shown, GUI feature 600 enables the user to select text by creating a range selection of text, drag the selected text, and drop the selected text on a particular recipient on contacts window 602. This drag-and-drop operation uses conventional components of Windows and other known operating systems and interface controls. In this example, the selected text is part of an ongoing chat between the user and Jane, the user drags the selected text and drops it on an icon representing Ally. In other examples, the selected text may be part of a document, part of an email, part of a website, and more. When the user activates "file-to-call" button 610 by selecting the icon shown, GUI feature 600 enables the user to browse and upload any type of file (e.g., data files, multimedia files, etc.) and select a particular recipient on contacts window 602.

Another example for implementing embodiments of the present disclosure may include selection of content using a right-click function over a highlighted text, which may open a contextual menu that contains numerous actions for the selection. Thereafter, electronic communications device 200 may receive an indication of the user's selection of an action. For example, an action to initiate a communications session relating to the selected content, an action to summarize the selected content, an action to set a reminder regarding the selected content, and more. In some embodiments, the user may be provided with means to select a recipient for the communications session (e.g., using drop-down list or combo-box). Alternatively, one or more recipients may be recommended by electronic communications device 200 based upon the nature of the selected content and knowledge that electronic communications device 200 may have or may obtain regarding other users with an expertise in the selected content (such as a subject matter expert), or a relationship to the selected content (such as an original author of the selected content, or a user who has collaborated in its production. Other ways in which GUI feature 600 may receive an input selection that includes a selected content to determine descriptive information and contact information that identifies the particular recipient are also within the scope of the present disclosure.

Second Example of GUI

Figure 7:
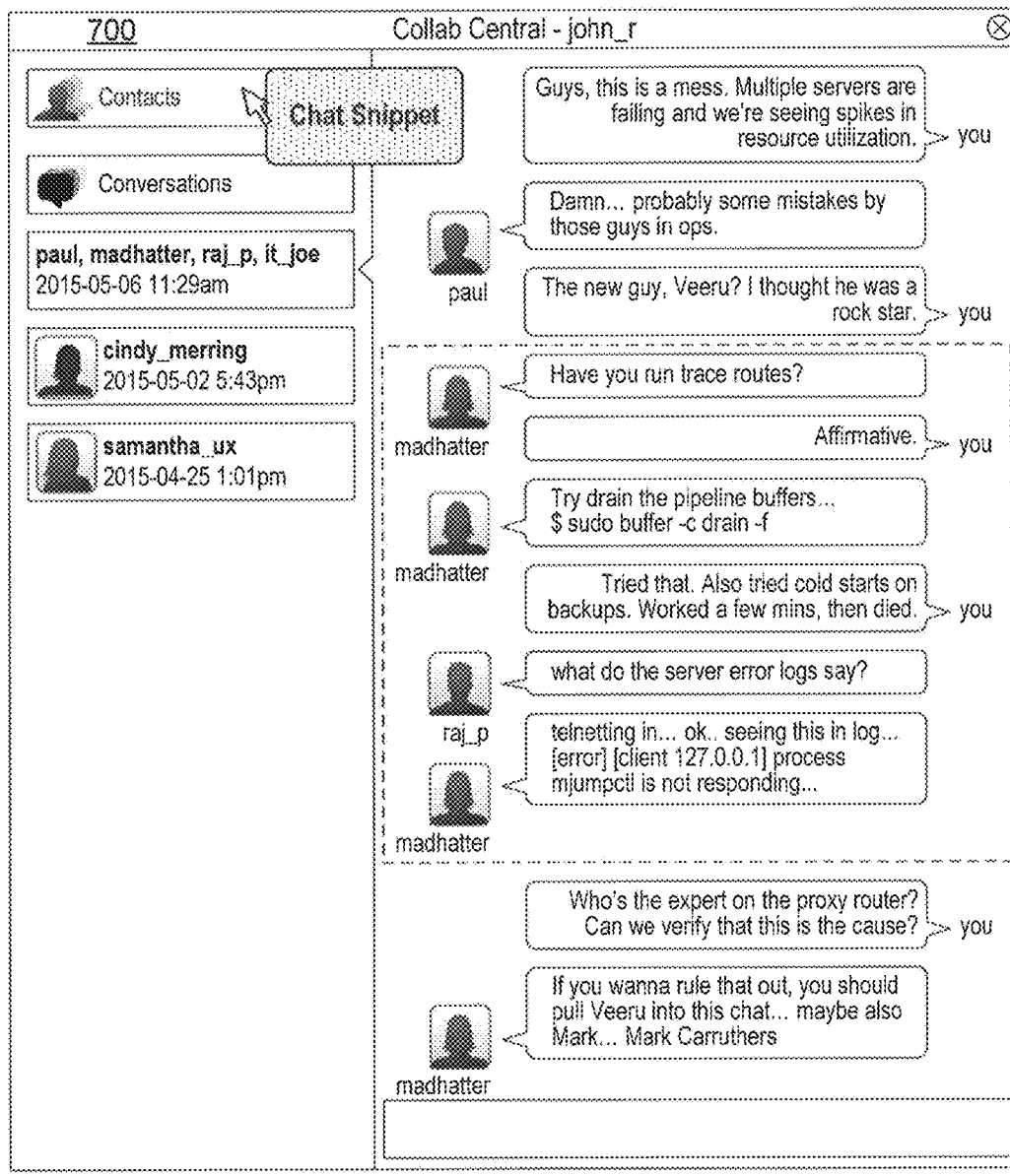

FIGS. 7-13 depict a GUI feature 700 that illustrates how user john_r initiates communication sessions when the selected content is a chat snippet. In FIG. 7, user john_r wants to send part of a chat conversation to user veeru_kumar, who has been mentioned in the chat. First, user john_r selects the section of the conversation he would like to send and starts dragging the selection to the contacts button. Hovering with the dragged chat snippet over the contacts button will activate the "springy folder" action of the button. Thereafter, a contacts list may be revealed and user john_r can drop the dragged chat snippet on the contacts list item for user veeru_kumar.

Figure 8:
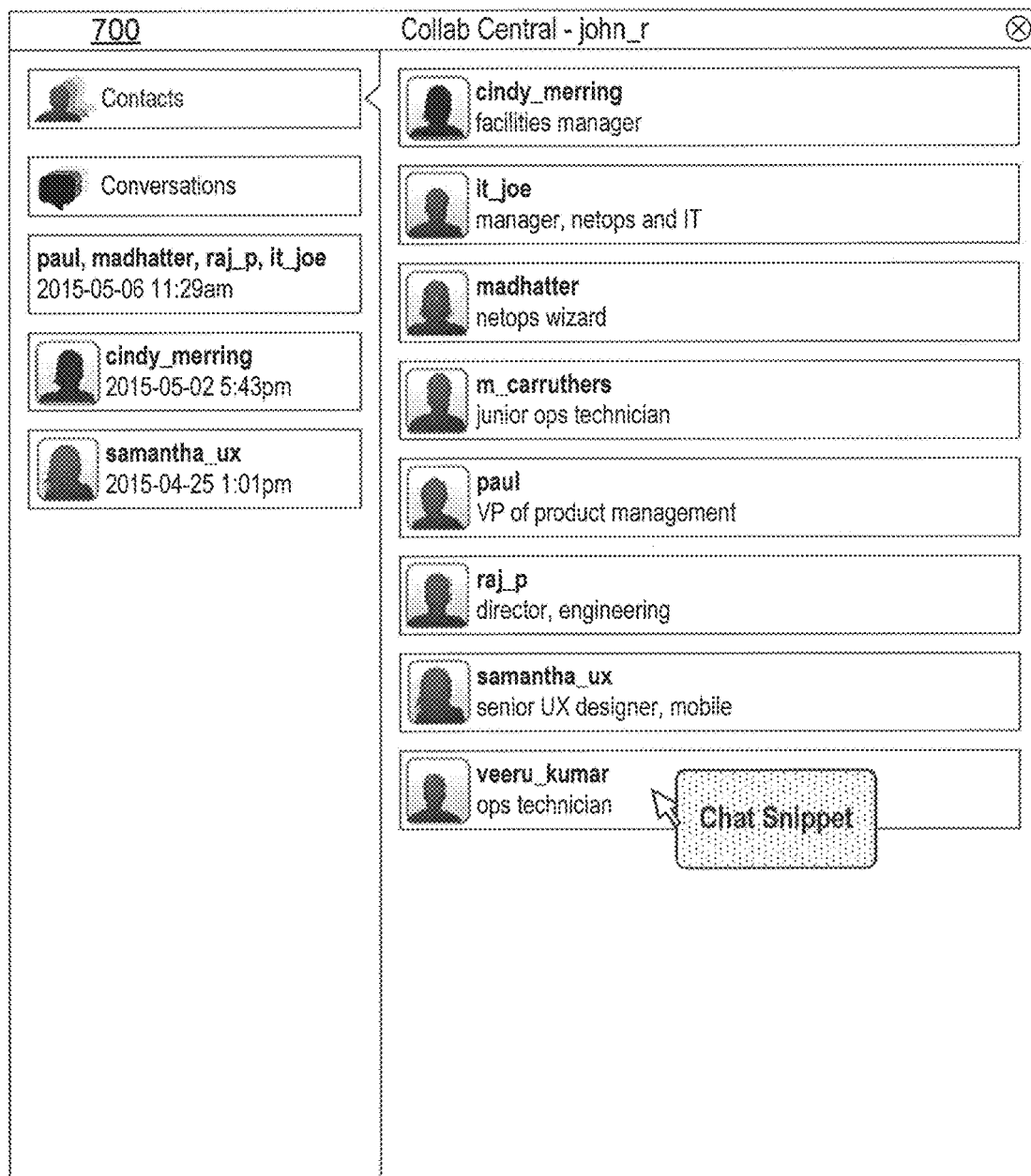

FIG. 8 depicts the contacts list that has been revealed during the drag operation by the "springy folder" action of the contacts button. As shown in FIG. 8, user john_r dragged the chat snippet to the contacts list item for user veeru_kumar. By dropping the chat snippet on an item representing user veeru_kumar, a communications session with user veeru_kumar will be initiated on the subject of the chat snippet.

Figure 9:
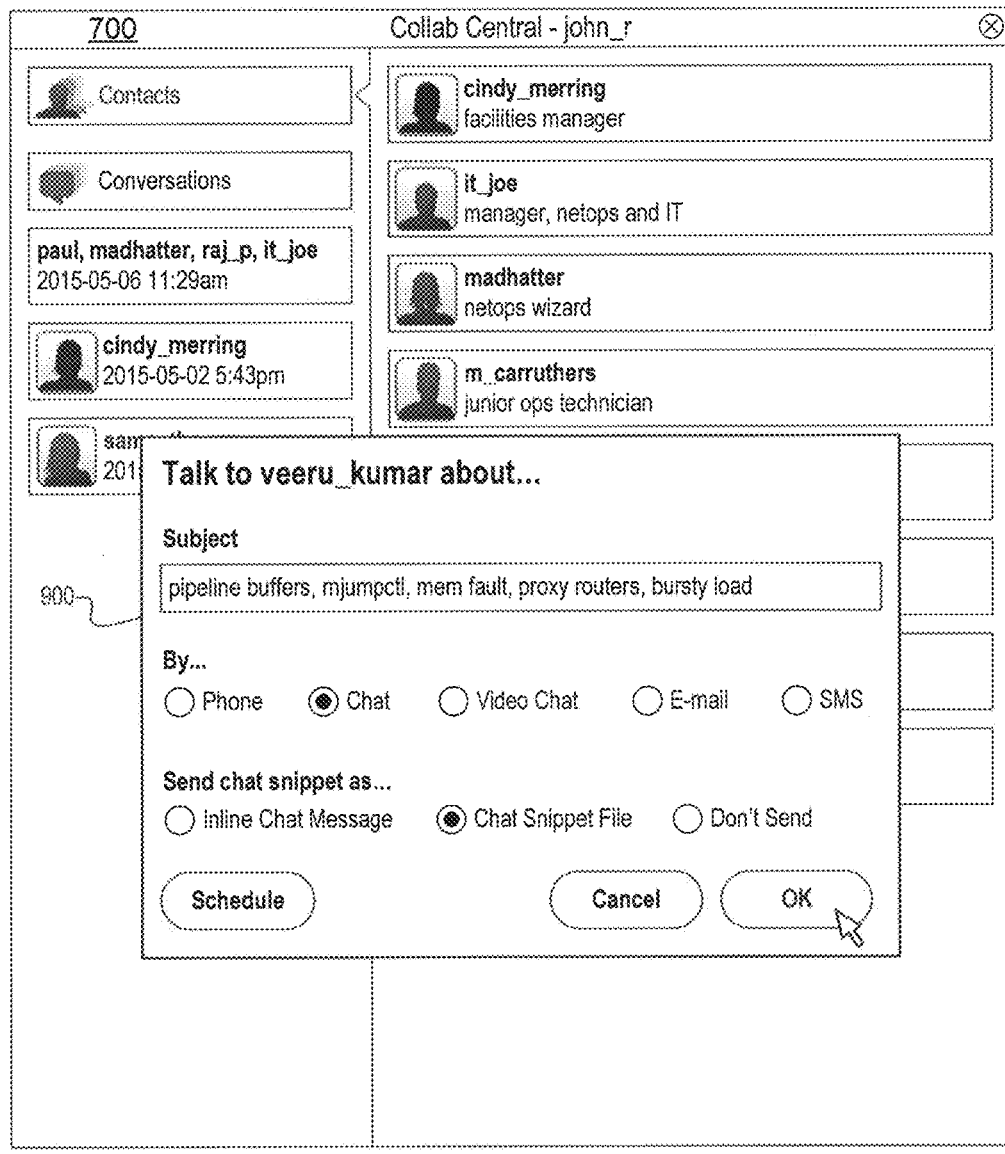

FIG. 9 presents a dialog window 900 that opens once user john_r drops the dragged chat snippet onto the contacts list item representing user veeru_kumar. Dialog window 900 allows user john_r to select how he would like to communicate with user veeru_kumar on the subject of the chat snippet. The selected content of the chat snippet may be analyzed to identify high value words and phrases, based upon an understanding of the areas of expertise of those involved in the chat. Thereafter, descriptive information may be automatically generated based on the selected content, for example, a subject for the communication. As depicted in the FIG. 9, user john_r still has the opportunity to edit and modify the descriptive information in dialog window 900 before initiating the communications session with user veeru_kumar. In this example, user john_r chose to communicate with user veeru_kumar by chat, and he selected to send the chat snippet as additional context to user veeru_kumar in the form of a chat snippet file.

Figure 10:
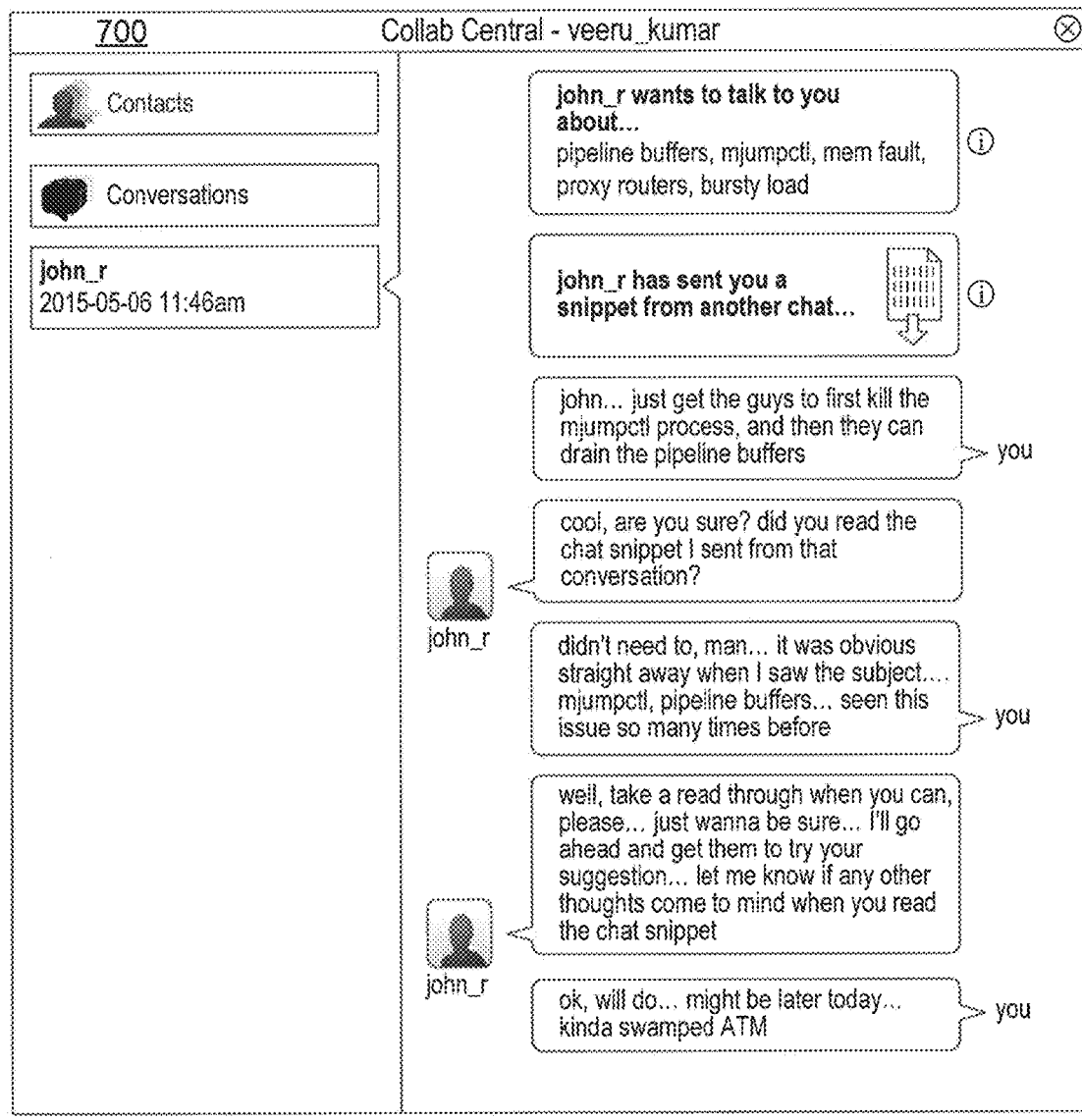

FIG. 10 depicts GUI feature 700 from the perspective of user veeru_kumar, after the chat session has been initiated between user veeru_kumar and user john_r. The chat has been started with a notification message describing the subject of the chat, and a message providing a link by which user veeru_kumar may download the chat snippet file to read through separately. In this embodiment, user veeru_kumar was able to ascertain immediately from the descriptive information what the communication is about, since the salient words and phrases in the generated subject provided an effective cue to his memory. Even before reading through the entire chat snippet, user veeru_kumar responds to user john_r with some preliminary advice.

Figure 11:
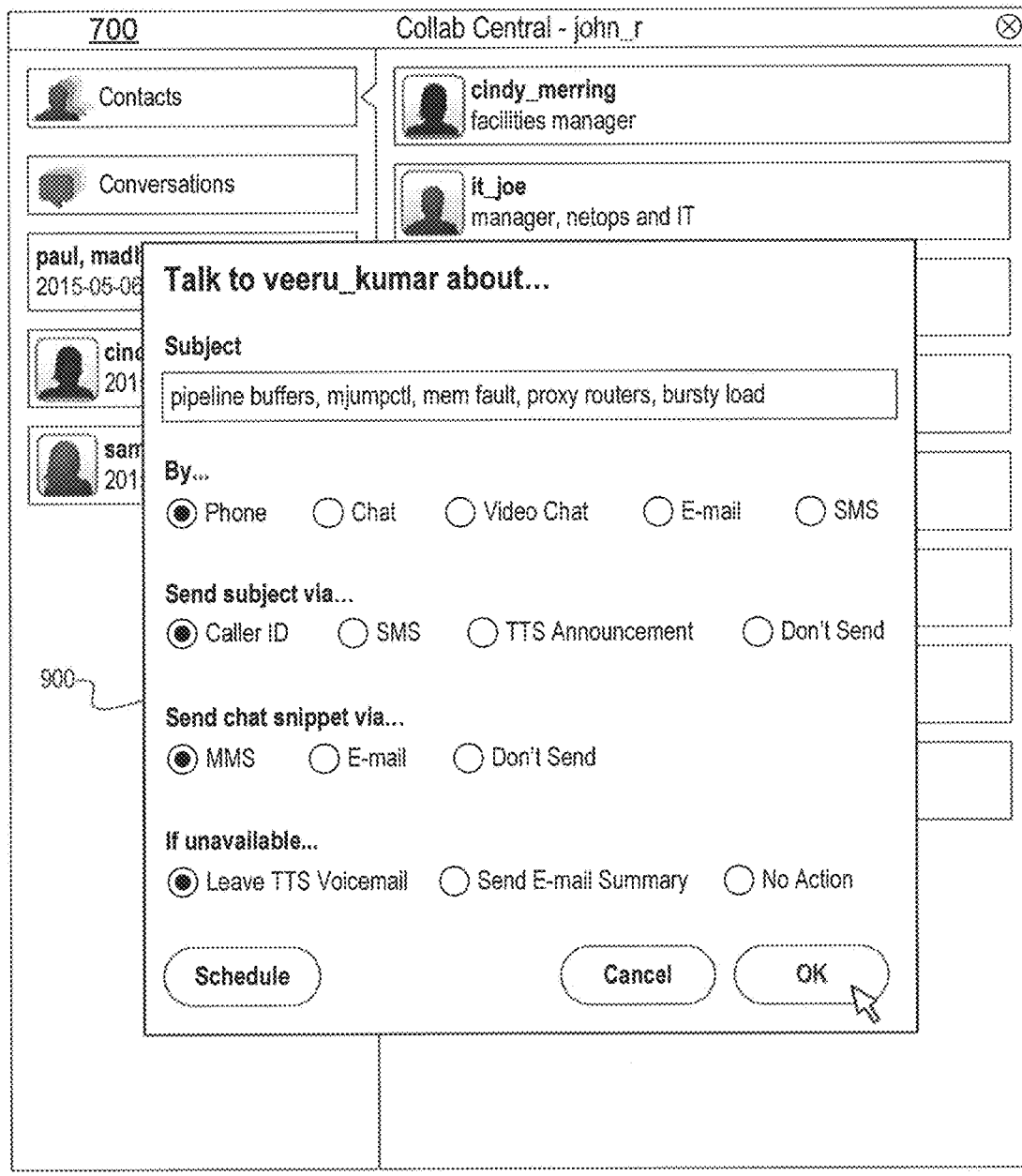

FIG. 11 depicts an alternative type of dialog window 900. In this example, user john_r selected to communicate with user veeru_kumar by way of a phone call. By selecting phone as the mode of communication, additional options relevant to this mode of communication are presented to user john_r. In this scenario, user john_r selected to have the generated descriptive information (e.g., the subject for the communication) to be transmitted to user veeru_kumar by way of an enhanced caller ID feature. The descriptive information may be displayed at user veeru_kumar's phone, alongside the information about caller user john_r. Furthermore, user john_r selected to have the chat snippet file sent to user veeru_kumar using the MMS protocol. Finally, user john_r selected that, if user veeru_kumar is not able to take the call, that the system will leave a voicemail message for user veeru_kumar. In some embodiments, a virtual voicemail may be generated from the text of the descriptive information (e.g., the subject for the communication). In other embodiments, the virtual voicemail may be generated from the selected content (e.g., the chat snippet).

Figure 12:
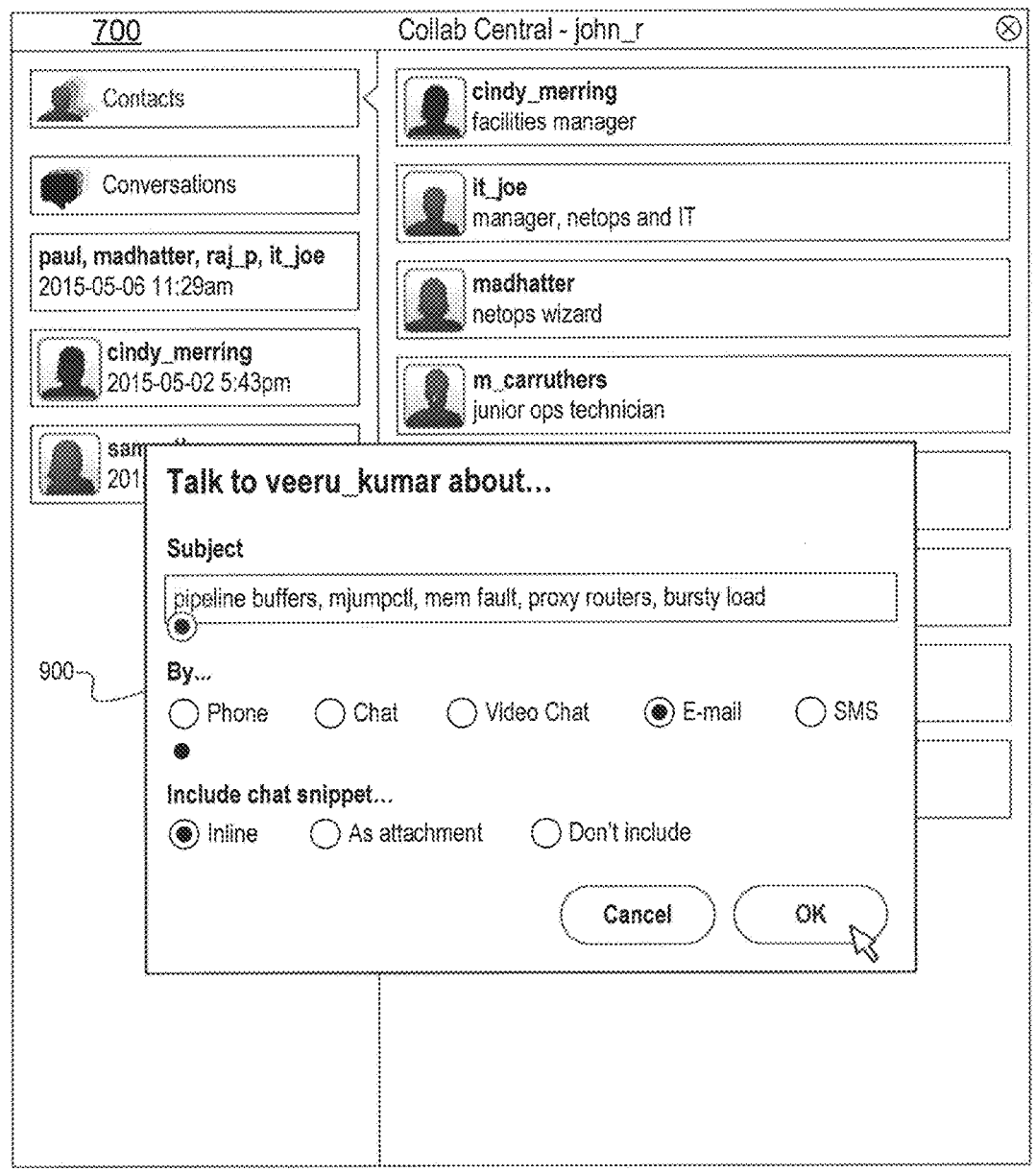

FIG. 12 depicts an additional alternative type of dialog window 900. In this example, user john_r selected to communicate with user veeru_kumar by way of e-mail. By selecting e-mail as the mode of communication, additional options relevant to this mode of communication may be presented to user john_r. In this case, user john_r selected to have the chat snippet transmitted to user veeru_kumar inline in the body of the e-mail message.

Figure 13:
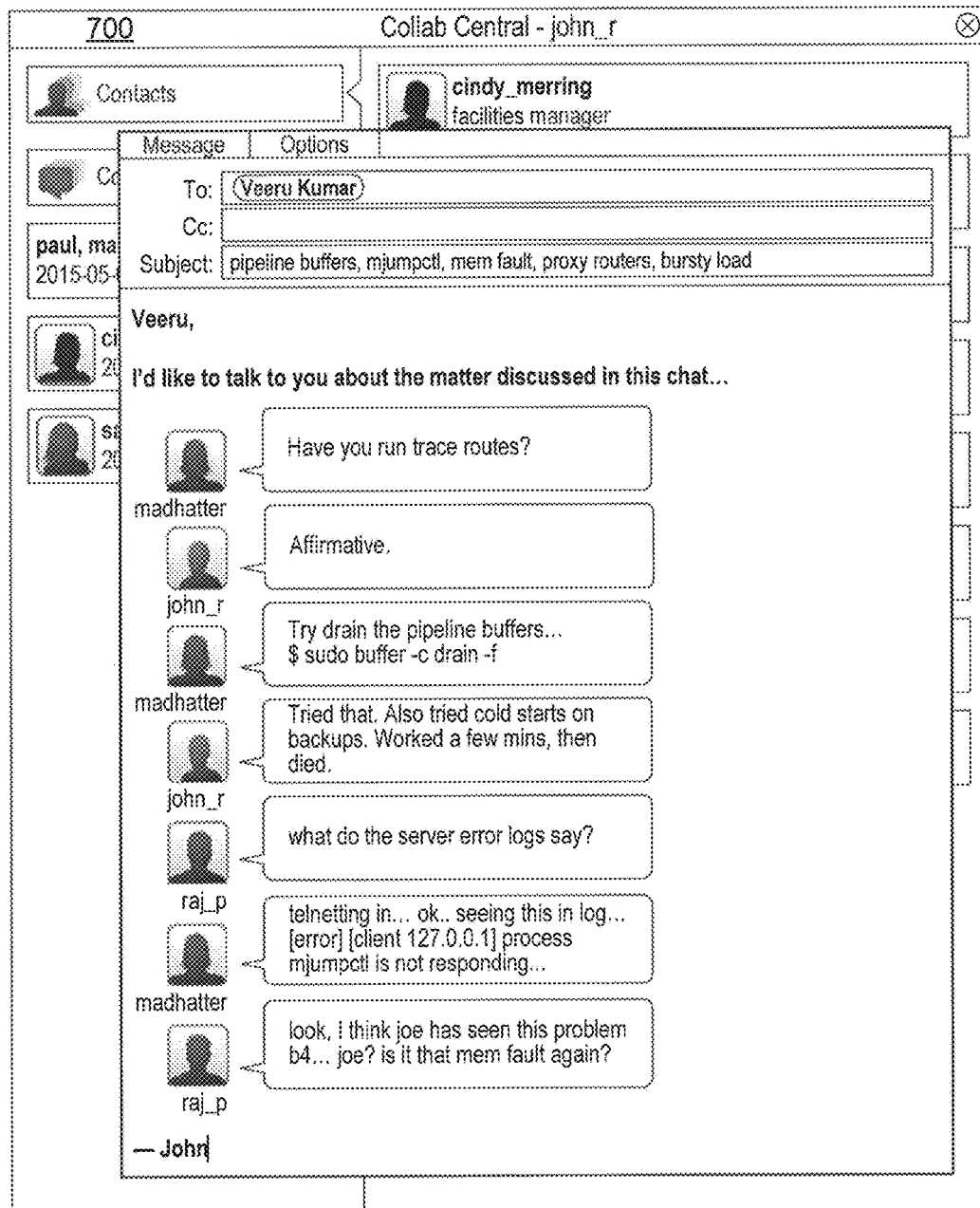

FIG. 13 depicts the e-mail that was automatically generated for user john_r enabling him to communicate with user veeru_kumar. As depicted in the FIG. 13, the new e-mail may be pre-populated with the descriptive information as the subject of the email and with the selected content in the e-mail message body or an attachment therefor, in text and/or image format. However, user john_r can still modify the subject line or message body before choosing to send the e-mail.

Third Example of GUI

FIGS. 14-16 depict a GUI feature 1400 that illustrates how user john_r may initiate communication sessions when the selected content is a document. In FIG. 14, user john_r wants to communicate with user paul on the subject of a specific document. The desired document may be selected using any way known in the art. For example, the desired document may be located using his operating system's file manager application. Then the desired document may dragged to the contacts list pane including user paul, and dropped on an item representing user paul to initiate a communications session with paul regarding the selected document.

FIG. 15 depicts a dialog window 900 that opens once user john_r drops the dragged document onto the contacts list item representing user paul. Dialog window 900 allows user john_r to select how we would like to communicate with paul on the subject of the selected document. The system may use the appropriate file format reader for the type of the selected document in order to read the contents of the document, and generates descriptive information (e.g., the subject for the communication). Additionally, the Metadata engine 440 may obtain the document title from the document's metadata. User john_r can still edit and modify the descriptive information in dialog window 900 before initiating the communications session with user paul. In this example, user john_r chose to communicate with user paul by chat, and to send the selected document as additional context to paul in form of a download link.

FIG. 16 depicts GUI feature 1400 from the perspective of user paul, after a chat session has been initiated between user paul and user john_r. The chat session has been started with a notification message describing the subject of the chat, and a message providing a link by which user paul may download the document that user john_r had selected. User paul then proceeds to chat with user john_r about the selected document.

Fourth Example of GUI

FIGS. 17-19 depict a GUI feature 1700 that illustrates how user john_r may initiate communication sessions when the selected content is a Web page. In FIG. 17 user john_r wants to communicate with user raj_p on the subject of a specific Web page displayed in his Web browser application. By clicking on a designated icon in his Web browser application, user john_r may drag the selected URL to the contacts list item representing user raj_p in the contacts list pane of his collaboration application. Dropping the dragged URL on the item representing user raj_p target will initiate a communications session with user raj_p about the Web page.

FIG. 18 depicts another alternative type of dialog window 900 that may open once user john_r drops the Web URL onto the contacts list item representing user raj_p. Dialog window 900 allows user john_r to select how he would like to communicate with user raj_p on the subject of the selected Web page. The selected Web page may be analyzed to identify the descriptive information. For example, the following objects may be considered: the HTML document's title tag, description meta tag, headers within the document's body, and other content from the specific Web page. User john_r can still edit and modify the descriptive information in dialog window 900 before initiating the communications session with user raj_p. In this example, user john_r chose to communicate with raj_p by way of a phone call, and selected options for this communication similar to those described with regards to FIG. 11. However, in this instance user john_r selected to schedule his phone call communication at some time in the future by clicking the "Schedule" button.

FIG. 19 depicts an additional dialog window that opens once user john_r clicks the "Schedule" button. This additional dialog window allows user john_r to choose the date, time, and duration for his scheduled phone call communication with user raj_p about the selected content (i.e., the Web page). Upon confirming his and raj_p's scheduled options, the system may send an automated meeting invite to both user john_r and user raj_p. In one embodiment, the descriptive information may be used as the subject for the meeting invite, and the message body of the invite may include the dragged Web URL. Furthermore, a background scheduling agent of a telephony system may manage the initiation of the phone call at the scheduled time, calling both user john_r and user raj_p and connecting them together in a call.

FIGS. 6-19 depict different types of GUI features that may be displayed personal computers. However, similar GUI features may be also implemented on mobile devices, such as, a smartphone or a tablet. For example, a user may select or highlight interesting content from a web-page using a long press. Thereafter, a pop-up menu of options can appear and one of the options may be generating a communications session about the selected content.

In the preceding specification, various preferred embodiments have been described with reference to the accompanying drawings. It will, however, be evident that various modifications and changes may be made thereto, and additional embodiments may be implemented, without departing from the broader scope of this disclosure as set forth in the claims that follow. The specification and drawings are accordingly to be regarded in an illustrative rather than restrictive sense.

For example, advantageous results still could be achieved if steps of the disclosed techniques were performed in a different order or if components in the disclosed systems were combined in a different manner or replaced or supplemented by other components. Although embodiments of the disclosure are illustrated using server 110, the embodiments described herein may also be implemented on individual terminal device 120 without departure from the principle of the disclosure. Other implementations are also within the scope of the following example claims.

Therefore, it is intended that the disclosed embodiments and examples be considered as examples only, with a true scope of the present disclosure being indicated by the following claims and their equivalents.

What is claimed is:

1. A communications device, comprising:
at least one processing device configured to:
receive an input selection for use in connection with a communications session, including content of a portion of a chat associated with at least one first user and contact information associated with a second user, wherein the second user is different from the at least one first user;
identify at least one object in the selected content to determine information describing the chat portion;
initiate a communications session with at least one terminal device associated with the second user based on the contact information; and
transmit a message, including the determined information, to the at least one terminal device associated with the second user.

2. The communications device of claim 1, wherein the communications device is a server, the input selection is received from a terminal device, and after receiving the input selection, the selected content is stored at a memory device included in the server.

3. The communications device of claim 1, wherein the communications device is a terminal device, the input selection is received from an input component, and the selected content is previously stored at a memory device included in the terminal device.

4. The communications device of claim 1, wherein the determined information included in the message transmitted to the at least one terminal device is prioritized according to predetermined rules.

5. The communications device of claim 1, wherein the message includes at least a timing indicator associated with an additional communications session between a user and the particular recipient.

6. The communications device of claim 1, wherein the message includes at least one detail regarding an additional communications session between a user of the communications device and the particular recipient, and the at least one processing device is further configured to:
upon receipt of an indication for non-delivery of the message, postpone initiating the additional communications session and retransmit the message.

7. The communications device of claim 1, wherein when the communications session is a chat session, the transmitted message includes at least one detail regarding an additional communications session between a user of the communications device and the second user, and the additional communications session is a phone call.

8. The communications device of claim 7, wherein the at least one processing device is further configured to initiate the communications session with a computer associated with the second user and to initiate the additional communications session with a phone associated with the second user.

9. The communications device of claim 1, wherein the selected content includes a portion of a chat associated with a plurality of first users.

10. The communications device of claim 1, wherein the at least one object includes key terms in the portion of a chat associated with the at least one first user, and the determined information transmitted to the second user includes one or more of the identified key terms.

11. A method for providing recipients with information regarding communications sessions, the method comprising:
receiving an input selection for use in connection with a communications session, including content;
identifying at least one object in the selected content to determine information describing the selected content, wherein the selected content includes of a portion of a chat associated with at least one first user;
using the at least one object identified in the selected content to determine a list of possible contacts;
receiving an input selection from the list of possible contacts;
using the contact information associated with the input selection to initiate the communications session with at least one terminal device associated with a particular recipient, wherein the particular recipient is different from the at least one first user; and
transmitting a message, including the determined information, to the at least one terminal device associated with the particular recipient.

12. The method of claim 11, wherein receiving the input selection includes creating a range selection of text, dragging the selected range and dropping it on an icon representing the contact information.

13. The method of claim 11, wherein the input selection includes a selection of a type of the communications session between a video communications session, an audio communications session, and a textual communications session.

14. The method of claim 11, wherein the transmitted message includes a requested type of an additional communications session between a user and the particular recipient.

15. The method of claim 14, wherein a type of the communications session is at least one of a video communications session, an audio communications session, and a textual communications session, and the communications session is a first type of communications session and the additional communications session is a second type of communications session other than the first type.

16. The method of claim 15, wherein the first type of communications session is initiated with a first terminal device associated with the particular recipient and the second type of communications session is initiated with a second terminal device associated with the particular recipient.

17. The method of claim 16, wherein the communications session initiated with the first terminal device and the additional communications session initiated with the second terminal device are initiated concurrently.

18. The method of claim 11, wherein the at least one object includes key terms in the selected content identified by one or more processing engines, and determining the information describing the selected content includes selecting one or more of the identified key terms.

19. The method of claim 11, further comprising:
upon receiving a confirmation that the particular recipient opened the message, initiating an additional communications session with the at least one terminal device associated with the particular recipient.

20. The method of claim 11, further comprising:
generating a voice message from the selected content, wherein the selected content includes at least one of the following: a document, an email, a fax, and a portion of chat; and
transmitting the voice message to the particular recipient.

21. The method of claim 20, wherein the voice message includes an audible version of the at least one object identified in the selected content.

22. The method of claim 20, wherein the voice message includes an audible version of the selected content generated from text associated with the at least one object.

23. The method of claim 11, further comprising:
using the determined information to select a preferred mode to communicate with the particular recipient based on the at least one object identified by one or more processing engines.

* * * * *